(12) United States Patent  (10) Patent No.: US 7,546,296 B2
Kimbara et al.  (45) Date of Patent: Jun. 9, 2009

(54) INFORMATION PROCESSING APPARATUS STARTED FROM A PROGRAM RECORDED ON A RECORDING MEDIUM WITH WELL-MAINTAINED SECURITY, AND A RECORDING MEDIUM STORING SUCH A PROGRAM AND A PRODUCING METHOD OF SUCH A RECORDING MEDIUM

(75) Inventors: Hiroyuki Kimbara, Kanagawa (JP); Tohru Harada, Kanagawa (JP); Nobuhito Inami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 813 days.

(21) Appl. No.: 10/801,822

(22) Filed: Mar. 17, 2004

(65) Prior Publication Data

US 2004/0268144 A1  Dec. 30, 2004

(30) Foreign Application Priority Data

Mar. 19, 2003 (JP) .............................. 2003-076607
Mar. 19, 2003 (JP) .............................. 2003-076608
Mar. 12, 2004 (JP) .............................. 2004-070193
Mar. 12, 2004 (JP) .............................. 2004-070194

(51) Int. Cl.
  *G06F 17/30* (2006.01)
(52) U.S. Cl. .......................................... 707/9; 707/100
(58) Field of Classification Search ......... 707/200–205, 707/9, 100; 726/1–5, 21–35
  See application file for complete search history.

(56) References Cited

U.S. PATENT DOCUMENTS 5,659,613 A * 8/1997 Copeland et al. ............ 380/202
6,243,796 B1 * 6/2001 Otsuka ........................ 711/163
6,687,829 B1   2/2004 Miyamoto et al.
2001/0053224 A1 * 12/2001 Kishi et al. .................. 380/232
2002/0046216 A1   4/2002 Yamazaki et al.
2002/0054326 A1   5/2002 Morita
2002/0116632 A1   8/2002 Itoh et al.
2003/0038968 A1 * 2/2003 Kawaura .................... 358/1.15
2004/0042363 A1 * 3/2004 Kobayashi et al. ........ 369/53.21
2004/0268144 A1   12/2004 Kimbara et al.

FOREIGN PATENT DOCUMENTS

JP   6-243087   9/1994

(Continued)

OTHER PUBLICATIONS

U.S. Appl. No. 10/227,308, filed Aug. 26, 2002, Kawaura.

(Continued)

*Primary Examiner*—Cheryl Lewis
(74) *Attorney, Agent, or Firm*—Oblon, Spivak, Mcclelland, Maier & Neustadt, P.C.

(57) ABSTRACT

An information processing apparatus starts a program from a recording medium while maintaining security of a program recorded on the recording medium. A detector detects a recording medium. A recording-medium starting section activates the recording medium detected by the detector to be in an accessible state. A program starting section performs an authentication check on the recording medium, reads a program from the recording medium when a result of the authentication check is normal, and starts an execution of the program.

78 Claims, 29 Drawing Sheets

FOREIGN PATENT DOCUMENTS

| | | |
|---|---|---|
| JP | 7-244584 | 9/1995 |
| JP | 8-153048 | 6/1996 |
| JP | 2001-350657 | 12/2001 |
| JP | 2002-10044 | 1/2002 |
| JP | 2002-82806 | 3/2002 |
| JP | 2002-84383 | 3/2002 |
| JP | 2002-91744 | 3/2002 |
| JP | 2002-251326 | 9/2002 |
| JP | 2003-6397 | 1/2003 |
| JP | 2003-47781 | 2/2003 |
| JP | 2003-67336 | 3/2003 |
| WO | WO 02/103495 A1 | 12/2002 |

OTHER PUBLICATIONS

U.S. Appl. No. 10/227,303, filed Aug. 26, 2002, Kawaura.
U.S. Appl. No. 10/227,921, filed Aug. 27, 2002, Senda.
U.S. Appl. No. 10/429,865, filed May 6, 2003, Kobayashi et al.
U.S. Appl. No. 10/457,349, filed Jun. 10, 2003, Kimbara.
U.S. Appl. No. 10/801,822, filed Mar. 17, 2004, Kimbara et al.
U.S. Appl. No. 11/009,415, filed Dec. 13, 2004, Harada, et al.

\* cited by examiner

INFORMATION PROCESSING APPARATUS STARTED FROM A PROGRAM RECORDED ON A RECORDING MEDIUM WITH WELL-MAINTAINED SECURITY, AND A RECORDING MEDIUM STORING SUCH A PROGRAM AND A PRODUCING METHOD OF SUCH A RECORDING MEDIUM

BACKGROUND OF THE INVENTION

1. Field of the Invention

The present invention generally relates to an information processing technique and an image forming technique and, more particularly, to an information processing apparatus and an image forming apparatus that start a program from a recording medium inserted into a slot, and a program-starting method and a recording medium.

The present invention also generally relates to a recording medium producing technique and, more particularly, to a recording medium producing method, a recording medium producing apparatus and a recording medium producing system for producing a recording medium, which stores a program which an information processing apparatus is caused to start, and a recording medium produced according to such a recording medium producing method, recording medium producing apparatus or recording medium producing system.

2. Description of the Related Art

Information-processing apparatuses such as a personal computer performs various information processing operations by executing at least one program corresponding to the information processing operations. Moreover, an image forming apparatus (hereinafter referred to as a combination machine) as an example of the information processing apparatus is provided with a display unit, a print unit, an picture-taking unit, etc. within a single housing, and also provided with four kinds of programs corresponding to a printer, a copier, a facsimile and a scanner so as to operate as a printer, a copier, a facsimile or a scanner by switching the programs to be executed.

Japanese Laid-Open Patent Application No. 2002-84383 discloses a combination machine as mentioned above.

In the information processing apparatus and the combination machine, a basic input/output system (BIOS) and a boot loader are started after turning a power on. The boot loader develops a Kernel and a root file system on a random access memory (RAM). Then, the kernel mounts the root file system. Here, the "mount" means a start of a file system or a peripheral device to operate in an accessible state.

After starting the kernel, a start program, which boots an application, is started. The start program is a process first started in an information-processing apparatus or a combination machine. The start program mounts a file system in accordance with a predetermined setting file and starts programs, which is recorded on a hard disk unit (HDD), necessary for operations of the information processing apparatus or a combination machine in accordance with a predetermined setting file.

Recently, there is an increasing demand for starting a program of an information-processing apparatus or a combination machine from a recording medium such as an SD (secure digital) card, which is detachably attached to the information apparatus or the combination machine.

However, since a recording medium such as the SD card, which is removably attached, can be used with a personal computer, there may be an injustice to a program recorded on the recording medium, such as a tamper or a copy of the program recorded on the recording medium.

Therefore, when starting a program of an information-processing apparatus or a combination machine from a removable recording medium, there is a problem in that a security of a program stored in a recording medium cannot be well-maintained.

SUMMARY OF THE INVENTION

It is a general object of the present invention to provide an information processing apparatus and a recording medium in which the above-mentioned problems are eliminated.

A more specific object of the present invention is to provide a technique to enable a start of a program from a recording medium while maintaining security of a program recorded on the recording medium.

In order to achieve the above-mentioned object, there is provided according to one aspect of the present invention an information processing apparatus comprising: a detector that detects a recording medium; a recording-medium starting section that activates the recording medium detected by the detector to be in an accessible state; and a program starting section that performs an authentication check on the recording medium, reads a program from the recording medium when a result of the authentication check is normal, and starts an execution of the program.

In one embodiment of the present invention, the information processing apparatus serve as image forming apparatus comprising: a detector that detects a recording medium; a recording-medium starting section that activates the recording medium detected by the detector to be in an accessible state; and a program starting section that performs an authentication check on the recording medium, reads a program relating to an image formation from the recording medium when a result of the authentication check is normal, and starts an execution of the program.

Additionally, there is provided according to another aspect of the present invention a program starting method comprising: detecting a recording medium; activating the detected recording medium to be in an accessible state; and performing an authentication check on the recording medium, reading a program from the recording medium when a result of the authentication check is normal, and starting an execution of the program.

Further, there is provided according to another aspect of the present invention a recording medium used with an information processing apparatus capable of detecting the recording medium when loaded thereto, the recording medium storing at least one program that is read by the information processing apparatus and starting the read program when a result of an authentication check on the read program is normal after the recording medium is detected and activated to be in an accessible state and the authentication check is performed.

According to the above-mentioned invention, the authentication check is performed on the recording medium before reading a program from the recording medium, and if the result of the authentication check is normal, the program recorded on the recording medium is read and started. Therefore, it can be determined whether or not the program recorded on the recording medium was subjected to an unfair practice prior to a start of the program, and, thus, a program that has not been subjected to an unfair practice can be selectively started.

Additionally, there is provided according to another aspect of the present invention a recording-medium producing method of producing a recording medium that stores a starting program which an information processing apparatus is caused to start, the recording-medium producing method comprising: producing license information using identification information of the recording medium; and recording the produced license information and the starting program on the recording medium.

Further, there is provided according to another aspect of the present invention a recording-medium producing method of producing an updating recording medium for updating a starting recording medium that stores a starting program to start an information processing apparatus, the recording-medium producing method comprising: producing an updating program for updating a program which the information processing apparatus is caused to start; and recording the produced updating program on the updating recording-medium.

There is provided according to one aspect of the present invention a recording-medium producing apparatus of producing a starting recording medium that stores a program which an information processing apparatus is caused to start, comprising: a license information creation section that produces license information using identification information of the recording medium; and a recording section that records the produced license information and the program for starting on the starting recording medium.

Additionally, there is provided according to one aspect of the present invention a recording-medium producing apparatus of producing a starting recording medium that stores a program which an information processing apparatus is caused to start, comprising: a license information creation section that produces license information using identification information of the recording medium; and a sending section that sends the produced license information and the program for starting to a recording section that records the produced license information and the program for starting on the starting recording medium.

Additionally, there is provided according to another aspect of the present invention a recording-medium producing apparatus of producing an updating recording medium for updating a starting recording medium that stores a program which an information processing apparatus is caused to start, comprising: an updating program creation section that produced an updating program that updates a program, which the information processing apparatus is caused to start, using identification information of the information processing apparatus; and a recording section that records the produced updating program on the starting recording medium.

Additionally, there is provided according to another aspect of the present invention a recording-medium producing apparatus of producing an updating recording medium for updating a starting recording medium that stores a program which an information processing apparatus is cause to start, comprising: an updating program creation section that produced an updating program that updates a program, which the information processing apparatus is caused to start, using identification information of the information processing apparatus; and a sending section that sends the updating program to a recording section that records the produced updating program on the starting recording medium.

Further, there is provided according to another aspect of the present invention a recording-medium producing system of producing a starting recording medium that stores a program which an information processing apparatus is caused to start, comprising: a license information creation section that produces license information of the starting recording medium using identification information of the starting recording medium; and a recording section that records the produced license information and the program for starting on the starting recording medium, wherein the license information creation section and the recording section are connected to each other via a predetermined network.

Additionally, there is provided according to another aspect of the present invention a recording-medium producing system of producing an updating recording medium for updating a starting recording medium that stores a program which an information processing apparatus is caused to start, comprising: an updating program creation section that produced the updating program using identification information of the information processing apparatus; and a recording section that records the produced updating program on the updating recording medium, wherein the updating program creation section and the recording section are connected to each other via a predetermined network.

Further, there is provided according to another aspect of the preset invention a recording medium for storing at least one program which an information processing apparatus is caused to start, wherein the recording medium stores license information produced using identification information of the recording medium and a starting program produced based on the identification information of the information processing apparatus and the program which the information processing apparatus is caused to start.

Additionally, there is provided according to another aspect of the present invention a recording medium for updating a starting recording medium that stores a program which an information processing apparatus is caused to start, the recording medium stores identification information of the information processing apparatus and an updating program that updates a program which the information processing apparatus is caused to start.

According to the above-mentioned present invention, the license information and the starting program, which can be easily justified, can be recorded on the starting recording medium that stores a program which the information processing apparatus is caused to start. Moreover, according to the above-mentioned invention, the updating program, which can be easily justified, can be recorded on the updating recording medium that is provided for updating the starting recording medium. Thus, according to the above-mentioned invention, the justice or validity of the program recorded on the recording medium can be easily checked, and, thereby, a start and update of the program from the recording medium can be achieved while maintaining a safety of the program recorded on the recording medium.

Other objects, features and advantages of the present invention will become more apparent from the following detailed description when read in conjunction with the accompanying drawings.

DETAILED DESCRIPTION OF THE PREFERRED EMBODIMENTS

First Embodiment

Figure 1:
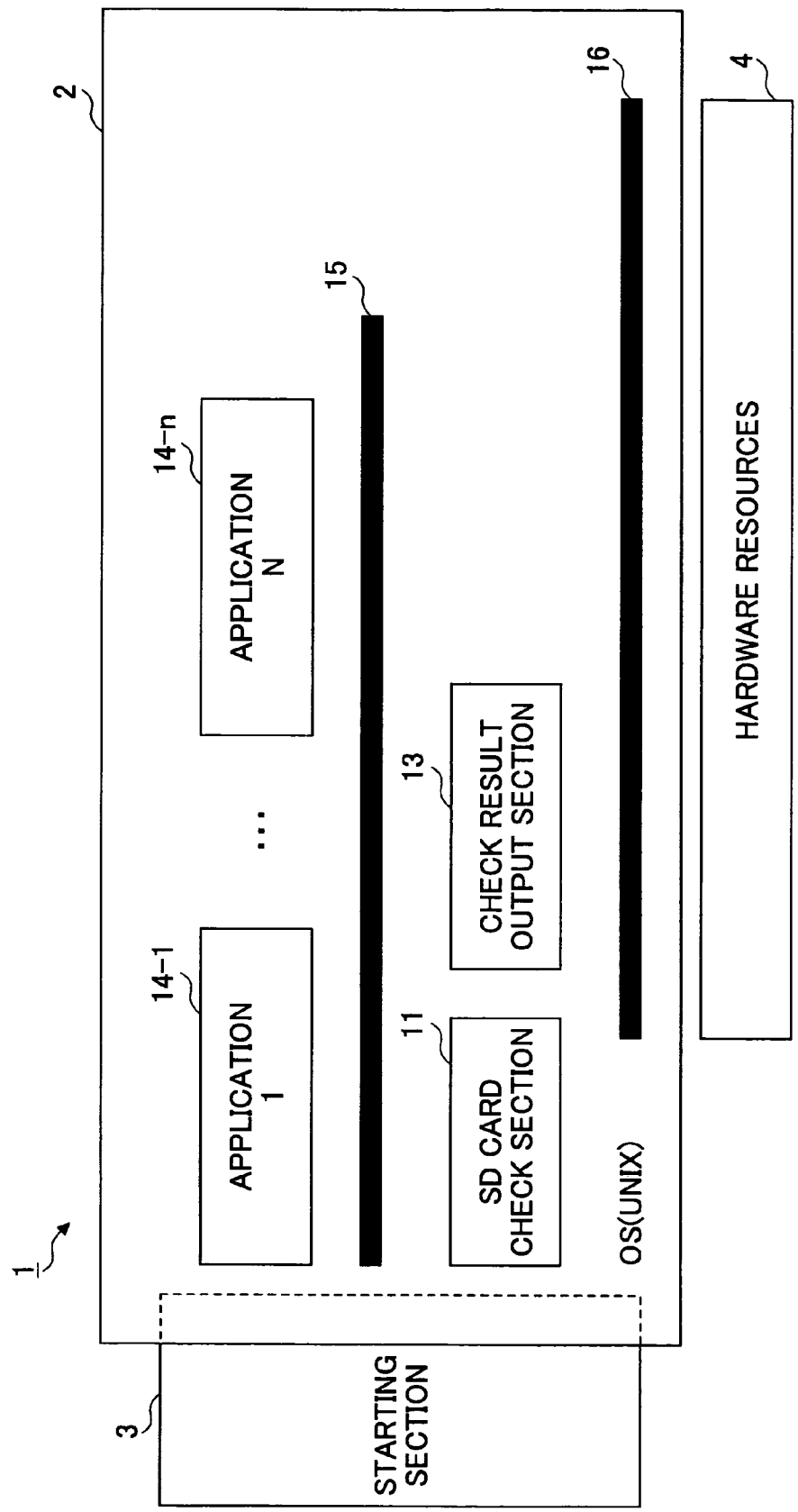
FIG. 1 is a block diagram of an information processing apparatus according to a first embodiment of the present invention.

A description will now be given of a first embodiment of the present invention. FIG. 1 is a block diagram of an information processing apparatus according to a first embodiment of the present invention.

The information processing apparatus 1 shown in FIG. 1 comprises a software group 2, a starting section 3 and hardware resources 4. The starting section 3 is initially operated at the time of turning on a power of the information processing apparatus 1 so as to operate a program starting section mentioned later. The program starting section starts software in the software group 2 of the information processing apparatus 1. For example, the program starting section of the starting section 3 reads the programs of an SD card check section 11, a check result output section 13 and applications 14-1 to 14-n from an auxiliary memory device, and transfers the read programs to a memory device so as to start each program.

The hardware resources 4 include resources, such as an input device, a display device, an auxiliary memory device, a memory device, an interface device and a slot for SD cards. Moreover, the software group 2 includes the programs of the SD card check section 11, the check result output section 13 and the application 14-1 to 14-n that are operated on an operating system (OS) such as the UNIX (trademark). The OS concurrently controls the programs of the SD card check section 11, the check result output section 13 and the application 14-1 to 14-n.

An application program interface (API) 15 is used to receive a request from the applications 14-1 to 14-n in accordance with previously defined functions. An engine interface (I/F) 16 is used to send a request to the hardware resources 4 in accordance with previously defined functions.

Figure 2:
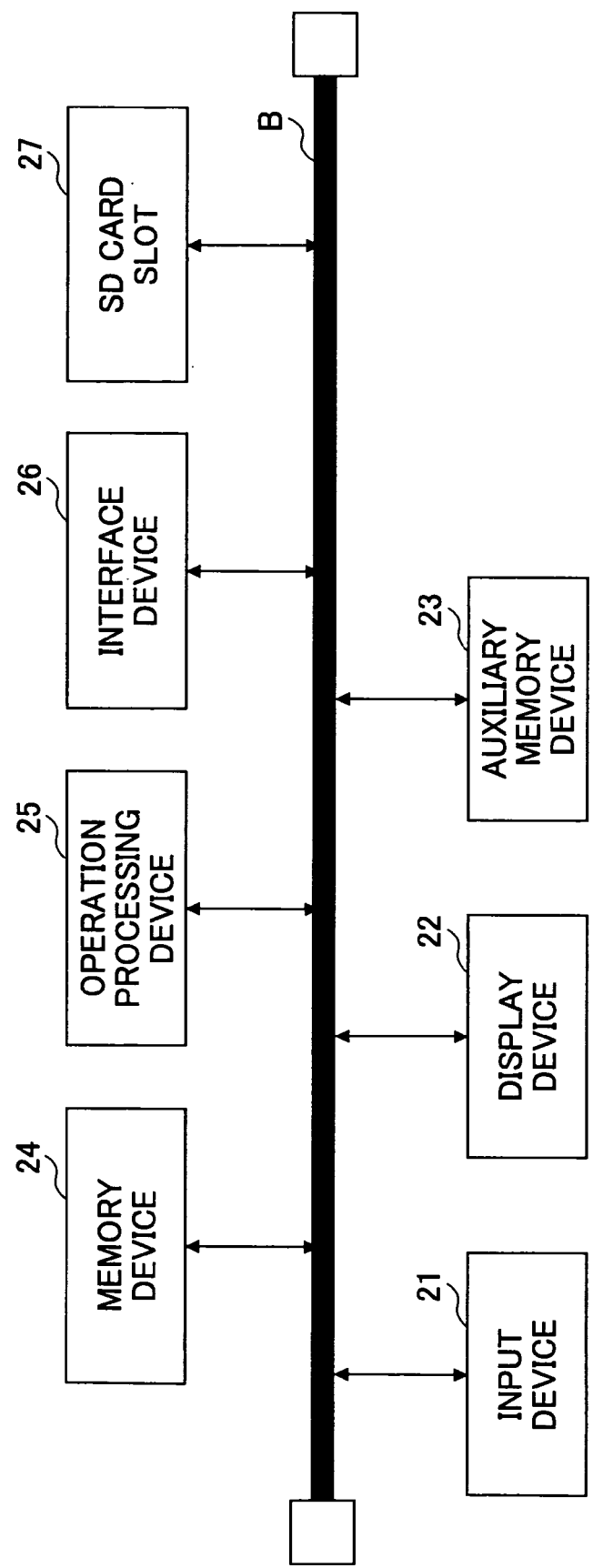
FIG. 2 is a hardware structure diagram of the information processing apparatus according to the first embodiment of the present invention.

It should be noted that the SD card check section 11, the check result output section 13 and the program starting section will be explained later. A description will now be given, with reference to FIG. 2, of a hardware structure of the information processing apparatus 1. FIG. 2 is a hardware structure diagram of the information processing apparatus according to the first embodiment of the present invention.

The information processing apparatus 1 comprises: an input device 21, a display device 22, an auxiliary memory device 23, a memory device 24, an operation processing apparatus 25, an interface device 26 and an SD card slot 27, which are connected to each other through a bus B.

The input device 21 includes a keyboard, a mouse, etc., so as to input various operation instructions to the information processing apparatus 1. The display device 22 displays various windows, data, etc. used for operations. The interface device 26 is an interface for connecting the information processing apparatus 1 to a network, and comprises a modem, a router, etc.

An SD card can be removably inserted into the SD card slot 27. The SD card slot performs an interruption process on an SD card status monitor mentioned later in response to an insertion or removal of the SD card.

An auxiliary memory device 23 stores programs of the SD card check section 11, the check result output section 13 and applications 14-1 to 14-n that causes the information processing apparatus 1 to perform operations, and also stores various files, data, etc., which are required for the execution of the programs. The memory device 24 reads and stores the programs of the SD card check section 11, the check result output section 13 and applications 14-1 to 14-n from the auxiliary memory device 23 at the time of starting an operation of the information processing apparatus 1.

Then, the operation processing device 25 performs processes according to programs of the SD card check section 11, the check result output section 13 and applications 14-1 to 14-n stored in the memory device 24.

A description will now be given, with reference to FIG. 3, of a structure of a combination machine 31 as an example of application of the information processing apparatus 1 according to the first embodiment of the present invention. It should be noted that although an operation of the combination machine 31 will be mainly explained in the present embodiment, a similar operation is performed by the information processing apparatus 1.

Figure 3:
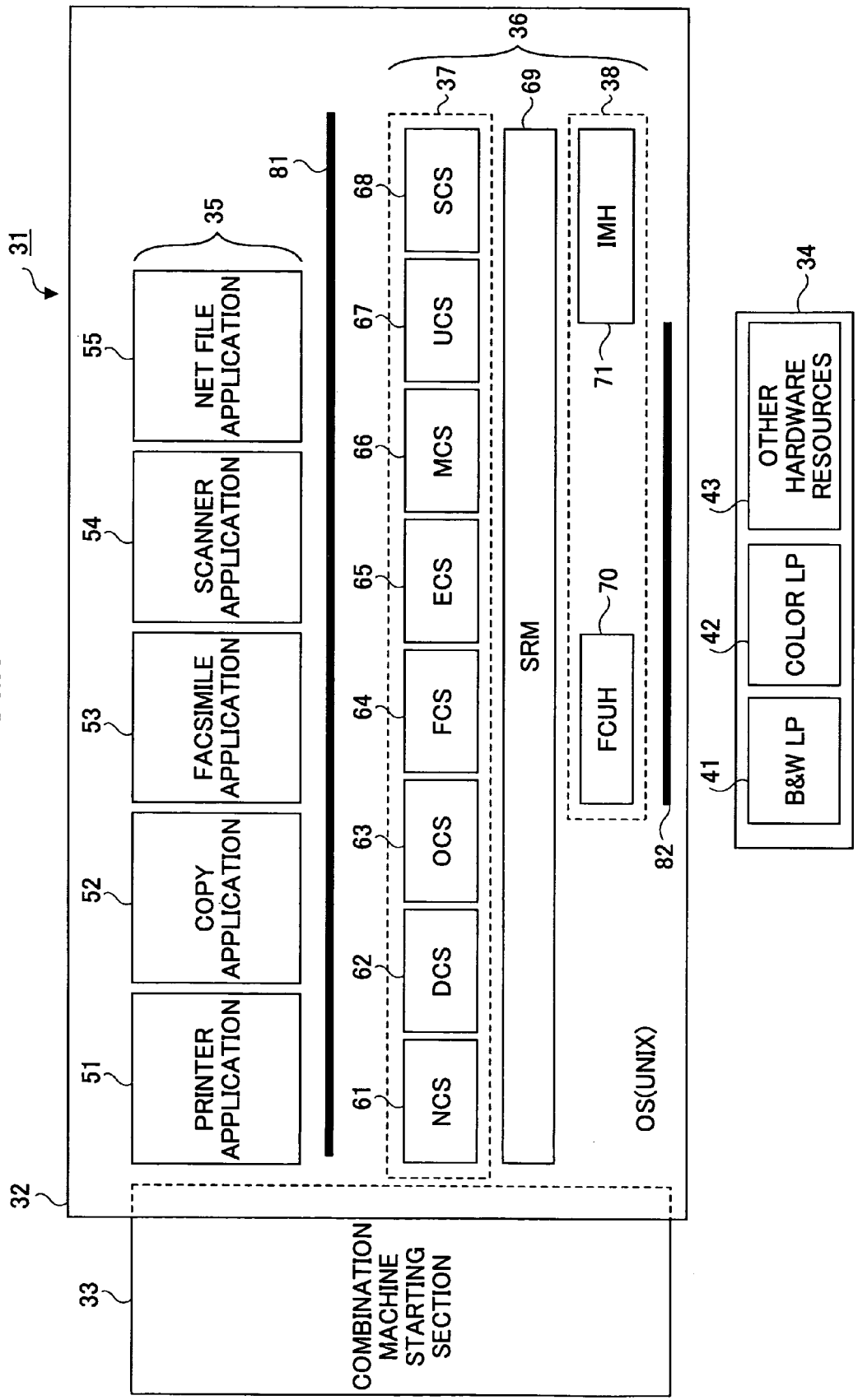
FIG. 3 is a block diagram of a structure of the combination machine.

FIG. 3 is a block diagram of a structure of the combination machine 31. The combination machine 31 comprises a software group 32, a combination-machine starting section 33 and hardware resources 34. The software group 32 includes an application layer 35 and platform 36 that are operated on an operating system (OS) such as the UNIX (trademark). Moreover, the hardware resources 34 include a monochrome laser printer (B&W LP) 41, a color laser printer (Color LP) 42 and other hardware resources 43 such as a scanner and a facsimile.

The application layer 35 includes a printer application 51, a copy application 52, a facsimile application 53, a scanner application 54 and a network file application 55. The platform 36 includes a control service layer 37, a system resource manager (SRM) 69 and a handler layer 38. The control service layer 37 interprets a process request from the application layer 35 so as to generate acquisition requests for the hardware resources 34. The SRM 69 manages the hardware resources 34 and arbitrates the acquisition requests from the control service layer 37. The handler layer 38 manages the hardware resources 34 in accordance with the acquisition requests from the SRM 69.

The control service layer 37 includes one or more service modules, such as a network control service (NCS) 61, a delivery control service (DCS) 62, an operation panel control service (OPS) 63, a fax control service (FCE) 64, an engine control service (ECS) 65, a memory control service (MCS) 66, a user information control service (UCD) 67 or a system control service (SCS) 68. It should be noted that the platform 36 is arranged to include an application program interface (API) 81. The OS carries out parallel execution of each software of the application layer 35 and the platform 36 as a process.

The process of NCS 61 performs intermediacy at the time of transmitting and receiving data. The process of DCS 62 controls distribution of document data accumulated in the combination machine. The process of OCS 63 controls an operation panel, which is an information communication means between an operator and a main controller. The process of FCS 64 provides an API for transmitting and receiving facsimile data. The process of ECS 65 controls the engine section of the hardware resources 34. The process of MCS 66 performs a memory control. The process of UCS 67 manages user information. The process of SCS 68 performs a process of controlling the system. The process of SRM 69 performs together with the SCS 68 a control of the system and a management of the hardware resources 34.

The handler layer 38 includes a facsimile control unit handler (FCUH) 70 which manages a facsimile control unit (FCU) mentioned later and an image memory handler (IMH) 71, which assigns a memory area to a process and manages the memory area assigned to a process. The SRM 69 and the FCUH 70 make a process request to the hardware resources 34 using the engine interface (I/F) 82. According to the structure shown in FIG. 3, the combination machine 31 is capable of performing processes common to the applications in a centralized manner at the platform 36.

Figure 4:
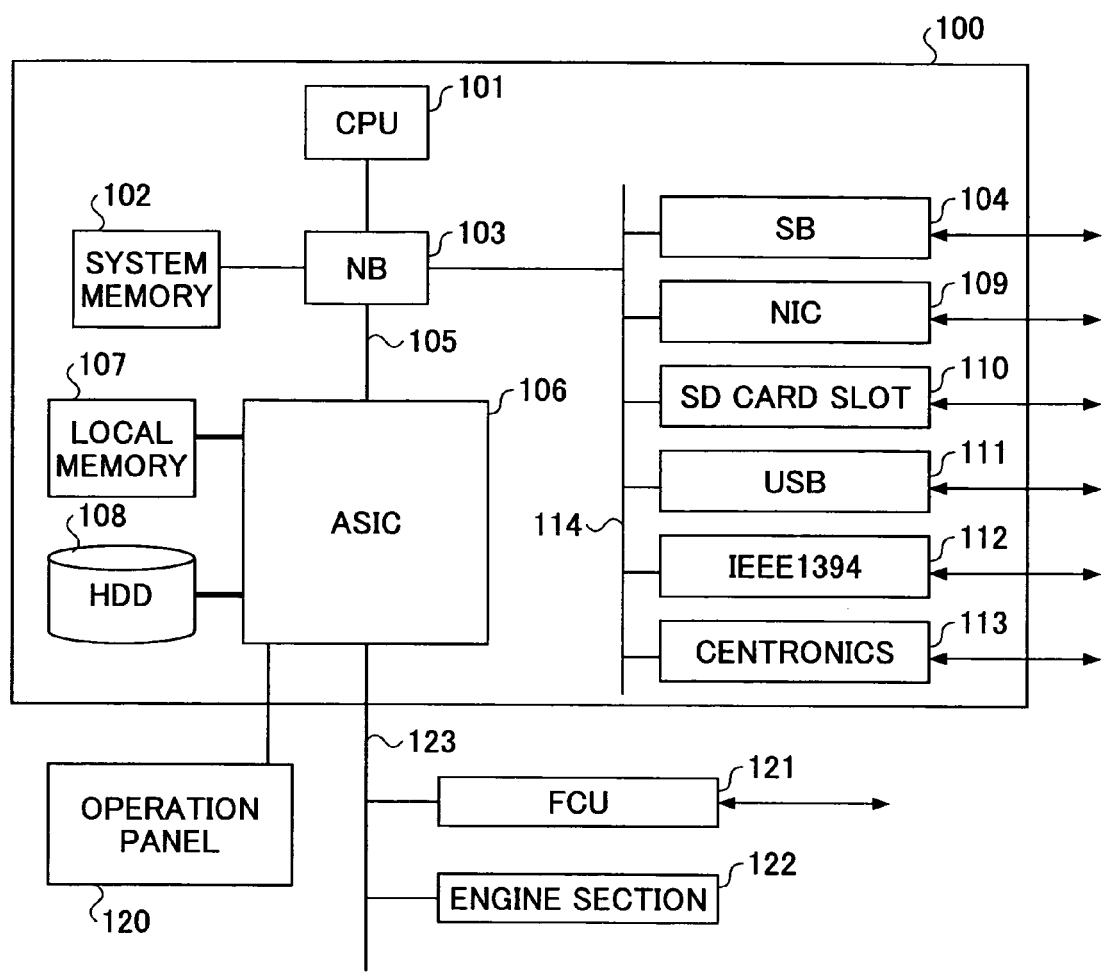
FIG. 4 is a block diagram of a structure of the combination machine.

A description will now be given, with reference to FIG. 4, of a hardware structure of the combination machine 31. FIG. 4 is a block diagram of a structure of the combination machine 31. The combination machine 31 comprises a controller 100, an operation panel 120, a facsimile control unit (FCU) 121 and an engine section 122. The controller 100 includes a central processing unit (CPU) 101, a system memory 102, a north bridge (NB) 103, a south bridge (SB) 104, an application specification integrated circuit (ASIC) 106, a local memory 107, a hard disk drive unit (HDD) 108, a network interface card (NIC) 109, an SD card slot 110, an USB device 111, an IEEE1394 device 112, and a centronics 113.

The CPU 101 performs a control of the entire combination machine 31. For example, the CPU 101 starts and performs a process on the operating system. The NB 103 is a bridge. The SB 104 is a bridge for connecting a ROM, a peripheral device, etc. to a PCI bus 114. The system memory 102 is used as a memory for picture or the like in the combination machine 31. The local memory 107 is used as an image buffer or a code buffer for a copy.

The ASIC 106 is an IC for image-processing applications that has hardware components for image processing. The HDD 108 is an example of a storage device (an auxiliary memory device) which accumulates image data, document data, programs, font data, etc. The NIC 109 is an interface device, which connects the combination machine 31 to the network.

An SD card is can be removably inserted into the SD card slot 110. The SD card slot performs interruption process on an SD card status monitor drive (mentioned later) in response to insertion or removal of the SD card. The USB device 111, the IEEE1394 device 112 and the centronics 113 are interfaces according to each standard specification.

The operation panel 120 is an operation unit, which received an input operation of an operator and displays information to the operator. It should be noted that the FCU 121 has a memory so as to temporarily store facsimile data that is received while a power of the combination machine 31 is off.

Figure 5:
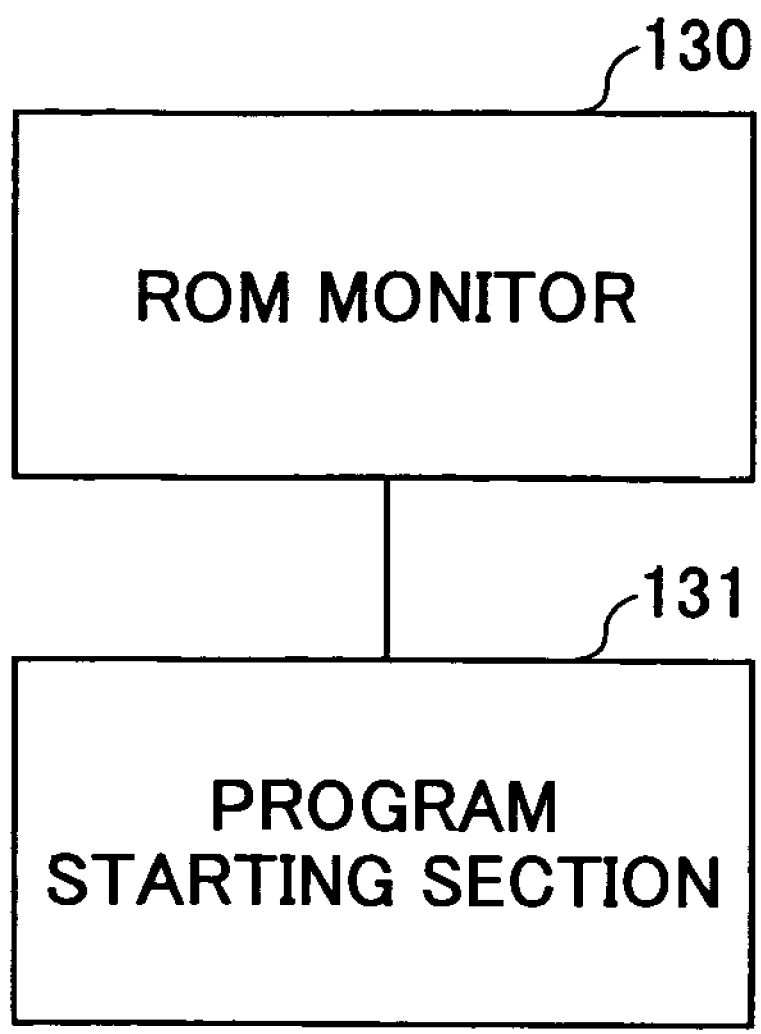
FIG. 5 is a structure diagram of an example of a combination machine starting section.

The combination machine starting section 33 shown in FIG. 3 is first operated at the time of turning on a power of the combination machine 31 so as to activate the application layer 35 and the platform 36. FIG. 5 is a structure diagram of an example of the combination machine starting section. The combination machine starting section 33 comprises a ROM monitor 130 and a program starting section 131.

The ROM monitor 130 serving as a BIOS and a boot loader is operated at the time of turning a power on so as to perform an initialization of the hardware, a diagnosis of the controller 100 and an initialization of the software. The ROM monitor 130 develops the OS and the root file system on the system memory 102 so as to boot the OS. Then, the OS mounts the root file system.

The program starting section 131 is called from the OS, and acquires memory areas in the system memory 102 and the local memory 107. The program starting section 131 is a process first started in the combination machine 31 so as to mount a file system according to a predetermined setting file.

The program starting section 131 reads the programs of the application layer 35 and the platform 36 that are necessary for an operation of the combination machine 31 from the HDD 108, the OM or the SD card in accordance with a predetermined setting file, and starts the processes of the application layer 35 and the platform 36 by developing the read programs on the acquired memory areas of system memory 102 and the local memory 107.

A description will be given below of the process of the program starting section 131. The program starting section 131 reads a predetermined master setting file at the time of starting so as to mount the file system and start the process in accordance with the read master setting file.

Moreover, if a description of the mount exists in the read master setting file, the program starting section 131 performs a mount process in accordance with the mount. Furthermore, if a predetermined setting file exists in the root of the mounted file system or if there is a predetermined directory containing a file having a predetermined extension in the root of the mounted file system, the program starting section 131 reads the predetermined setting file or the file having the predetermined extension so as to perform the mount process of the file system. It should be noted that there is a file system referred to as "gzromfs" or the like which the program starting section 131 can mount. The file system "gzromfs" mounts a gzip-compressed ROMFS file by developing it on a RAM.

Figure 6:
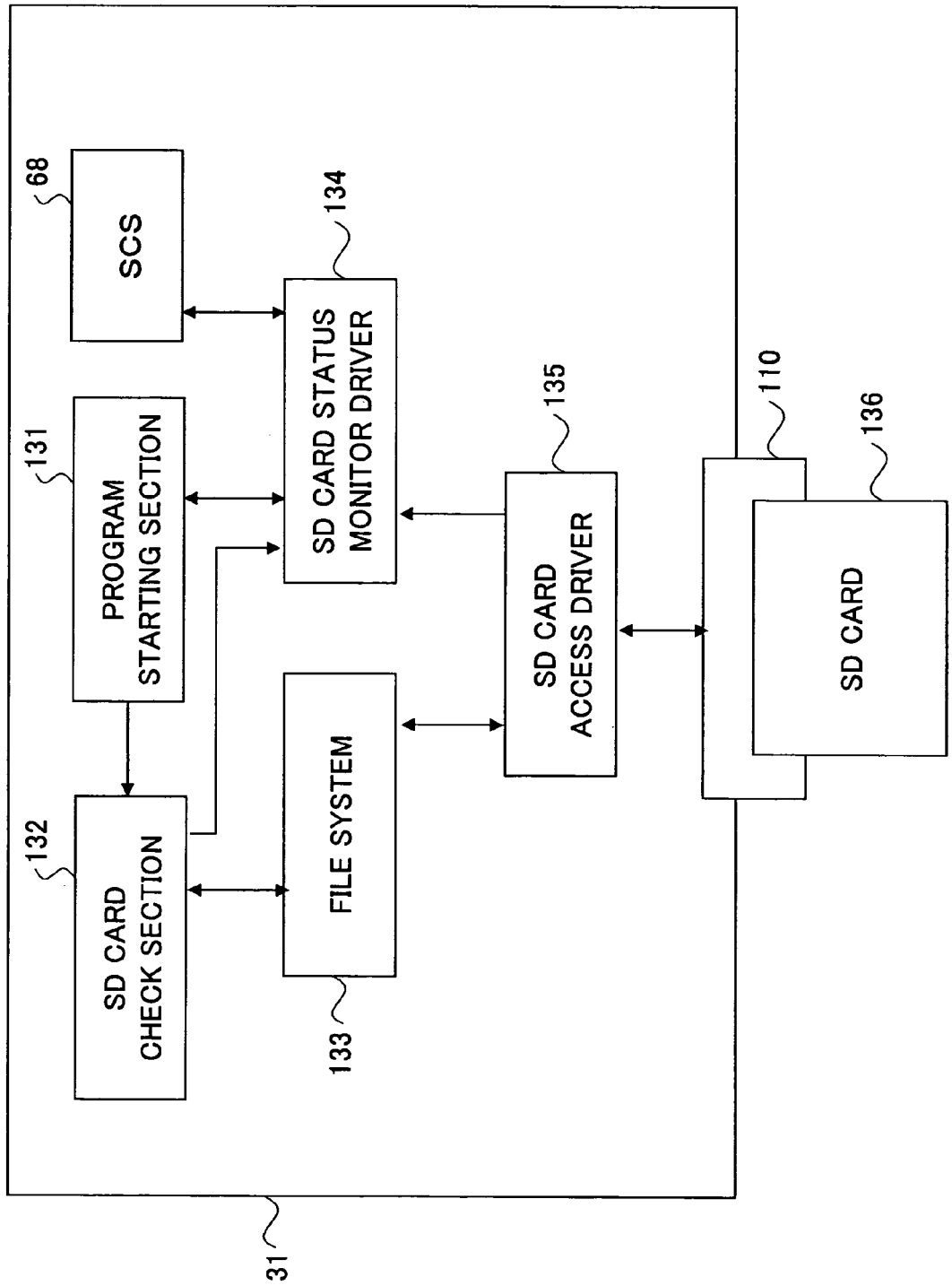
FIG. 6 is an illustration for explaining a start process of a program of the combination machine from an SD.

A description will be given below of an example of a start process of a program of the combination machine 31 from an SD card. FIG. 6 is an illustration for explaining a start process of a program of the combination machine 31 from an SD. In FIG. 6, structures necessary to be explained are shown, and structures that do not need to be explained are omitted.

An SD card 136 is a recording medium that can be inserted into or removed from the SD card slot, which is generally referred to as a plug and play, while a power of the combination machine 31 is turned on. The SD card slot 110 permits an insertion or removal of the SD card 136, and performs an interruption process on the SD card access driver 135 in response to an insertion or removal of the SD card 136. The SD card slot 110 has a function of a detector, which serves as detection means for detecting the SD card (recording medium) inserted into the SD card slot 110

The SD card access driver 135 performs an access control to the SD card 136, and notifies the SD card status monitor driver 134 of an insertion or removal of the SD card 136 in response to an interruption from the SD card slot 110. The SD card status monitor drive 134 manages status information of the SD card such as an insertion, removal, mount or unmount of the SD card 136, and notifies the program starting section 131 of the status information of the SD card 136.

The program starting section 131 starts an operation of the SD card check section 132 according to an insertion or removal of the SD card 136. Moreover, the program starting section 131 starts execution of the program in the SD card 136 according to the status information of the SD card 136 supplied from the SD card status monitor driver 134. The SD card check section 132 checks consistency as a medium, that is, whether or not partitions are correct or whether or not the file system is correct, so as to cause the SD card 136 to be in a usable state. The SD card check section 132 has a checking function, a mounting function, an unmounting function, a status notifying function, etc., of the SD card 136. The SD card check section 132 serves as recording-medium starting means for activating the SD card (recording medium) 136 detected by the detection means to be in an accessible state. Moreover, the program starting section 131 serves as program starting means for performing the authentication check on the SD card (recording medium) 136, reading a program from the SD card 136 when a result of the authentication check is normal, and starting an execution of the read program.

A description will now be given, with reference to flowcharts, of a process procedure to read a program of the combination machine 31 from the SD card 136 and start the read program. The program starting section 131 is set in a state for waiting an event, after starting the processes of the application layer 35 and the platform 36 of the combination machine 32.

For example, if the SD card 136 is inserted into the SD card slot 110, the SD card access driver 135 notifies the SD card status monitor driver 134 of a detection of insertion of the SD cart 136 in response to the interruption by the SD card slot 110. The SD card status monitor driver 134 notifies the program starting section 131 of the detection of insertion of the SD card 136.

Figure 7:
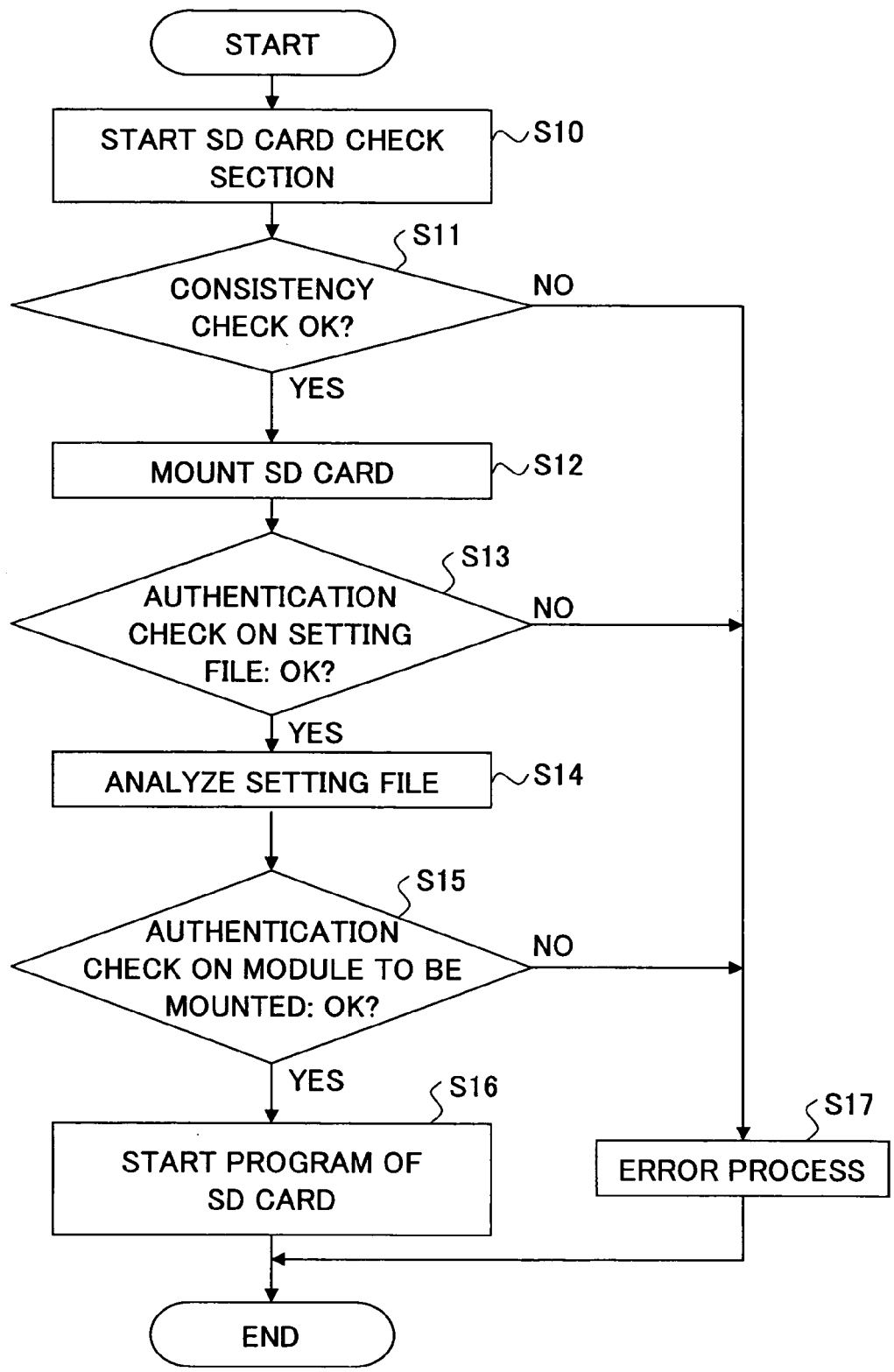
FIG. 7 is a flowchart of an example of an SD card insertion detection process.

When the detection of insertion of the SD card 136 is notified buy the SD card status monitor driver 134, the program starting section 131 determines that there is an event, and, thus, performs a process of a flowchart shown in FIG. 7. FIG. 7 is a flowchart of an example of an SD card insertion detection process.

In step S10, the program starting section 131 activates the SD card check section 132. Then, the process proceeds to step S11, where the SD card check section 132 checks inconsistency of the SD card 136 as a medium, that is, whether or not the SD card 136 is operable normally.

If the result of the check of consistency is good (YES of S11), the process proceeds to step S12, where the SD card check section 132 mounts the SD card 136. Then, the SD card check section 132 notifies the SD card status monitor driver 134 that the mount of the SD card has been completed, and ends the process. On the other hand, if the result of check of consistency is not good (NO of S11), the process proceeds to step S17, where the SD card check section 132 performs a predetermined error process.

When the program starting section is notified by the status monitor driver 134 that the SD card 136 has been mounted, the process proceeds to step S13, where the program starting section 131 performs, if there is a setting file in the mounted SD card 136, an authentication check of a setting file using an electronic authentication check library. It should be noted that the program starting section 131 returns to the event wait state, if there is no setting file in the mounted SD card 136.

Figure 8:
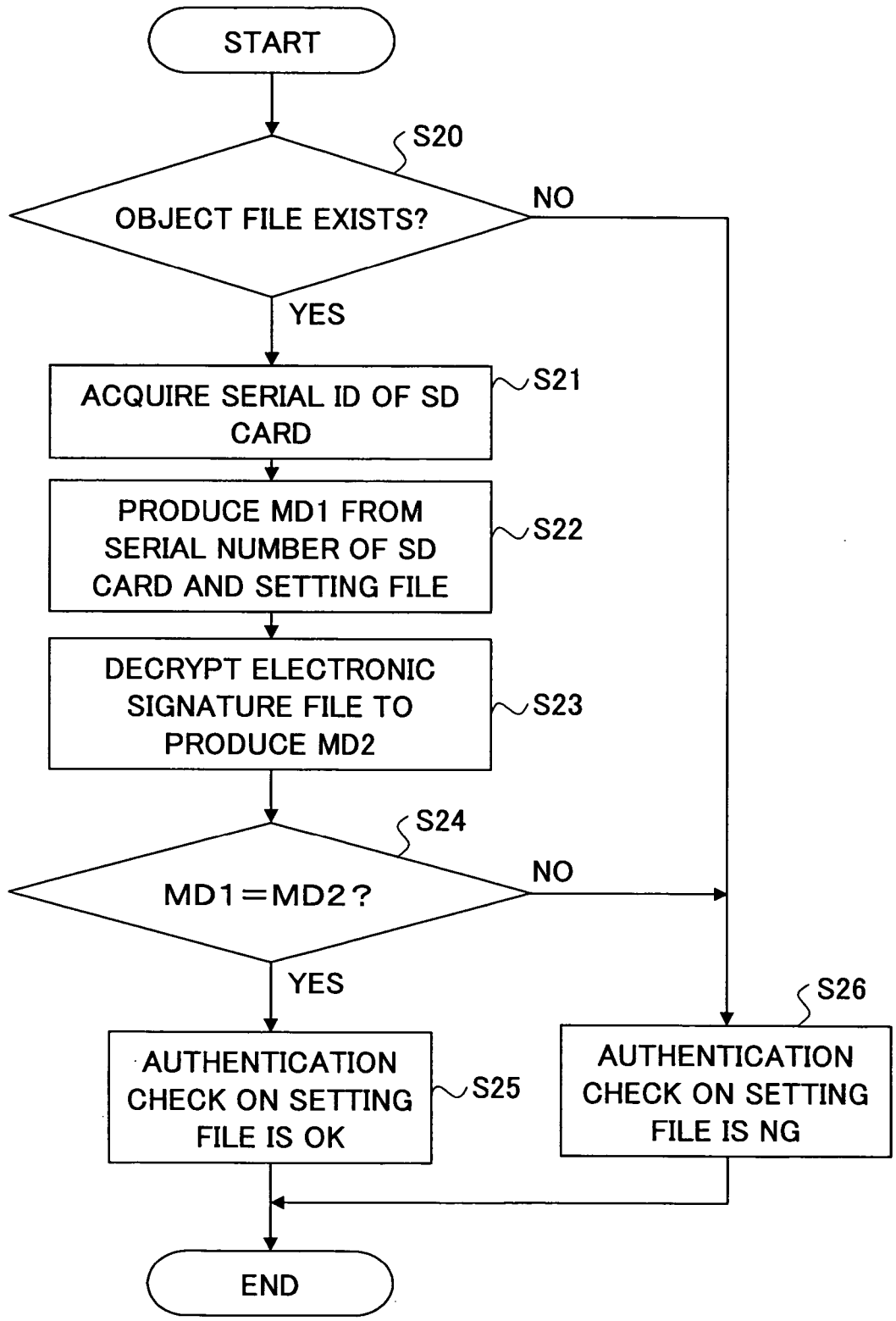
FIG. 8 is a flowchart of an example of a process of an authentication check of a setting file.

The authentication check of the setting file is performed as a process shown in the flowchart of FIG. 8. FIG. 8 is a flowchart of an example of a process of the authentication check of the setting file. In step S20, the program starting section 131 determines whether or not there is an object file to be used for the authentication check of the setting file in the SD card 136.

Figure 9:
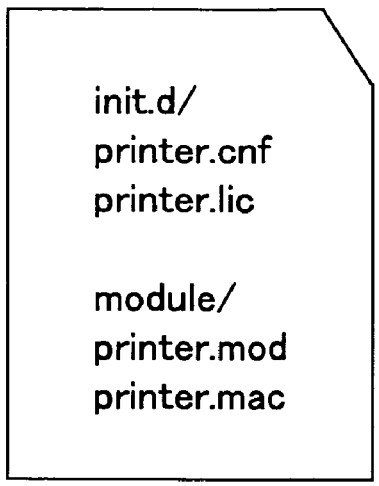
FIG. 9 is an illustration showing an example of an object file recorded on an SD card.

The object file used for the authentication check of the setting file includes a setting file and an electronic signature file produced from the setting file and a message digest (hereinafter referred to as MD) of a serial ID of the SD card. FIG. 9 is an illustration showing an example of the object file recorded on the SD card. In the example shown in FIG. 9, "printer.cnf" represents a setting file, "printer.lic" represents the electronic signature file used for the authentication check of the setting file, "printer.mod" represents a module file to be mounted, and "printer.mac" represents the electronic signature file used for the authentication check of the module to be mounted.

If it is determined that there is an object file to be used for the authentication check of the setting file (YES of S20), the program starting section 131 acquires the setting file and the electronic signature file used for the authentication check of the setting file from the SD card 136, and, thereafter, the process proceeds to step S21.

In step S21, the program starting section 131 acquires the serial ID of the SD card 136 from the SD card 136. Then, the process proceeds to step S22 where the program starting section 131 produces an MD1 corresponding to the setting file acquired in step S20 and the serial ID of the SD card 136 acquired in step S21. Then the process proceeds to step S23 where the program starting section 131 decrypts the electronic signature file acquired in step S20 with a public key so as to produce an MD2.

Then, the process proceeds to step S24, where the program starting section 131 determines whether or not the MD1 produced in the step S22 is equal to the MD2 produced in the step S23. If it is determined that the MD1 produced in the step S22 is equal to the MD2 produced in the step S23 (YES of S24), the process proceeds to step S25 where the program starting section 131 makes a determination that the result of the authentication check of the setting file is OK.

On the other hand, if it determined that the MD1 produced in step S22 is not equal to the MD2 produced in step S23 (NO of S24), the process proceeds to step S26 where the program starting section 131 determines that the result of the authentication check is not good. This is because if the MD1 produced in step S22 is not equal to the MD2 produced in step S23, it is highly possible that the file recorded on the SD card 136 has been copied unjustly. It should be noted that if it determined that there is no object file to be used for the authentication check of the setting file (NO of S20), the routine proceeds to step S26 where it is determined that the result of the authentication check of the setting file is not good.

Figure 10:
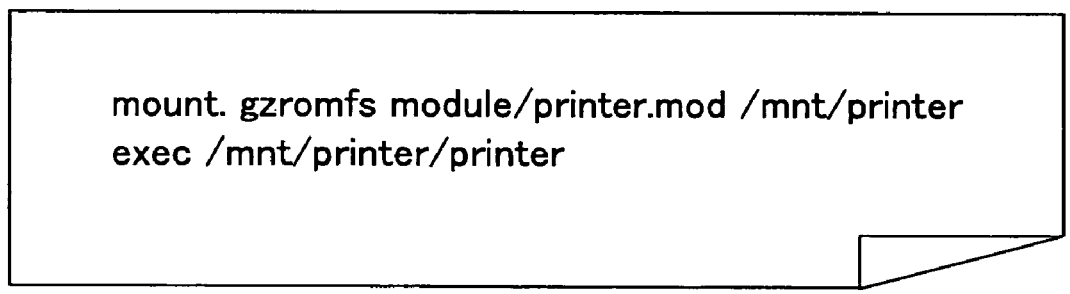
FIG. 10 is an illustration showing an example of a setting file.

Returning to FIG. 7, if the result of the authentication check of the setting file is good (YES of S13), the process proceeds to step S14 where the program starting section 131 performs an analysis of the setting file as shown in FIG. 10. On other hand, if the result of the authentication check of the setting file is not good (NO of S13), the process proceeds to step S17 where a predetermined error process is performed.

FIG. 10 is an illustration showing an example of the setting file. The setting file shown in FIG. 10 represents a process to mount a file "module/printer.mod" of a gzip-compressed ROMES format to a mount point "/mnt/printer" and to execute the mounted module file.

Figure 11:
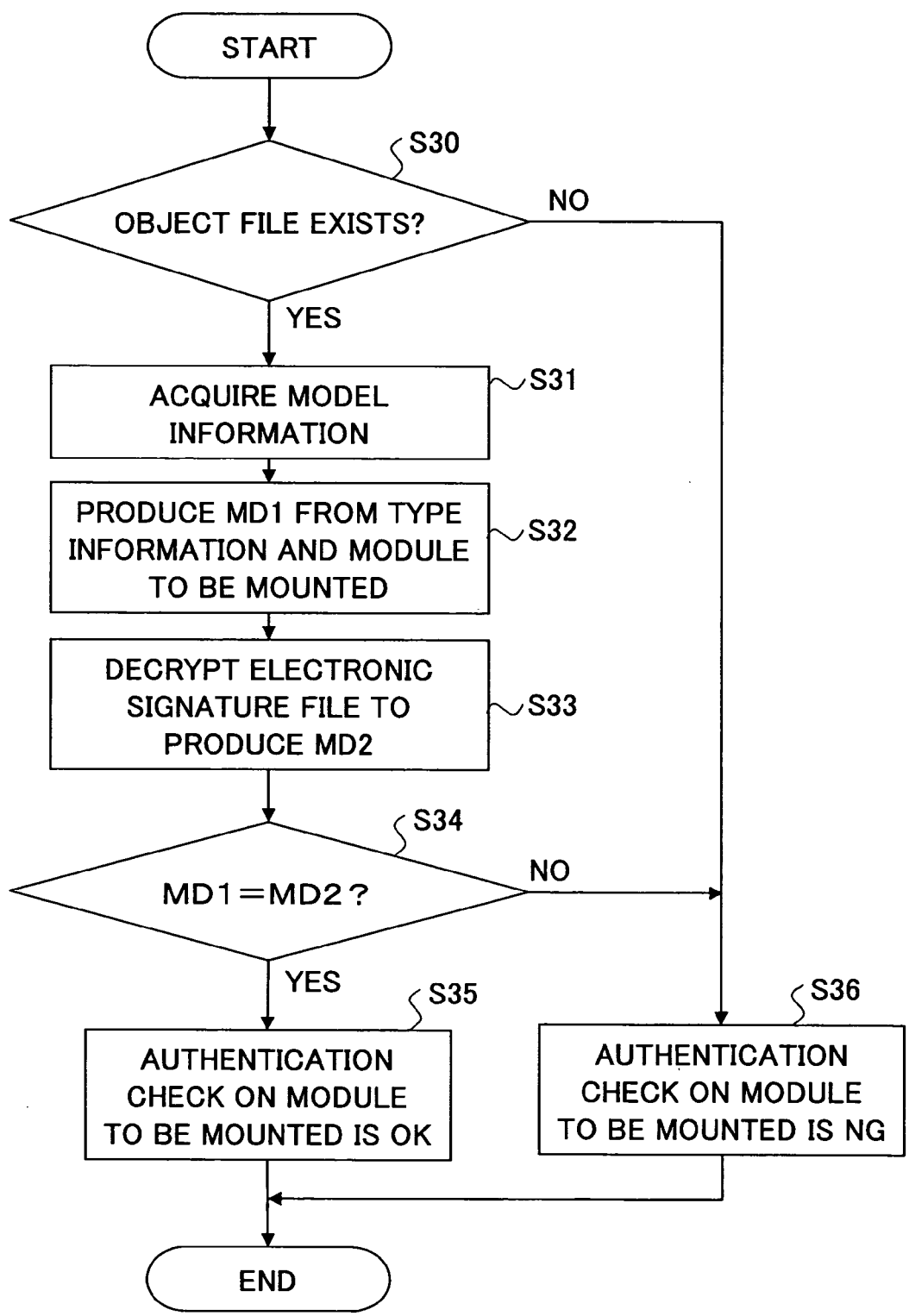
FIG. 11 is a flowchart of an example of a process of an authentication check performed on a module to be mounted.

Subsequent to step S14, the process proceeds to step S15 where the program starting section 131 performs, if there is a description of a mount in the setting file, an authentication check on the module to be mounted by using an electronic authentication check library. For example, the authentication check on the module to be mounted is performed according to a process shown by a flowchart of FIG. 11. FIG. 11 is a flowchart of an example of the process of the authentication check performed on the module to be mounted.

In step S30, the program starting section 131 determines whether or not the object file, which is used for authentication check of the object to be mounted, exists in the SD card 136. The object file used for the authentication check of the module to be mounted includes a module file to be mounted and an electronic signature file produced from the module file and the MD of model information peculiar to the combination machine 31.

If it is determined there exists the object file to be used for the authentication check of the module to be mounted (YES of S30), the program starting section 131 acquires the module file to be mounted and the electronic signature file used for the authentication check of the module file to be mounted, and the process proceeds to step S31.

In step S31, the program starting section 131 acquires the model information peculiar to the combination machine 31. Then, the process proceeds to step S32 where the program starting section 131 produces the MD1 corresponding to the module file acquired in step S30 and the model information peculiar to the combination machine 31 acquired in step S31. Thereafter, the process proceeds to step S33 where the program starting section 131 decrypts the electronic signature file acquired in step S30 with a public key so as to produce the MD2.

Then, the process proceeds to step S34 where the program starting section 131 determines whether or not the MD1 produced in step S32 is equal to the MD2 produced in step S33. If it is determined that the MD1 produced in step S32 is equal to the MD2 produced in step S33 (YES of S34), the process proceeds to step S35 where the program starting section 131 determines that the result of the authentication check of the module to be mounted is good.

On the other hand, if it determines that the MD1 produced in step S32 is not equal to the MD2 produced in step S33 (NO of S34), the routine proceeds to step S36 where the program starting section 131 determines that the result of the authentication check of the module to be mounted is not good (NG). This is because if the MD1 produced in step S32 is not equal to the MD2 produced in step S33, it is highly possible that the file recorded on the SD card 136 has been subjected to an unfair practice such as a tamper or an unauthorized copy.

It should be noted that is it is determined that there exists no object file to be used for the authentication check of the module to be mounted (NO of S30), the process proceeds to step S36 where the program starting section 131 determines that the result of the authentication check of the module to be mounted is not good (NG).

Returning to FIG. 7, if the result of the authentication check of the module to be mounted is good (OK) (YES of step S15), the process proceeds to step S16 where the program starting section 131 mounts the module to be mounted and performs the mounted module. It should be noted that if the result of the authentication check of the module to be mounted is not good (NG) (NO of step S15), the process proceeds to step S17 where a predetermined error process is performed.

It should be noted that the combination machine 31 is capable of notifying an operator by an LED display of a function button of functions that have become available due to the process of step S16. For example, a copy function and a scanner function can be indicated as being available by lighting the LED display of a copy button and a scanner button in blue. For example, a printer function and a facsimile function can be indicated as being available by lighting the LED display of the printer function button and the facsimile function button. The LED display of the copy function button, the scanner function button, the printer function button and the facsimile function button may be controlled by the SCS 68.

Although the combination machine 31 was mainly explained in the present embodiment, the technique according to the present invention is easily applicable to the information processing apparatus 1 shown in FIG. 1 and FIG. 2. In the information processing apparatus 1, the check result output section 13 may perform the process that is performed by the SCS 68 shown in FIG. 6.

Second Embodiment

Figure 12:
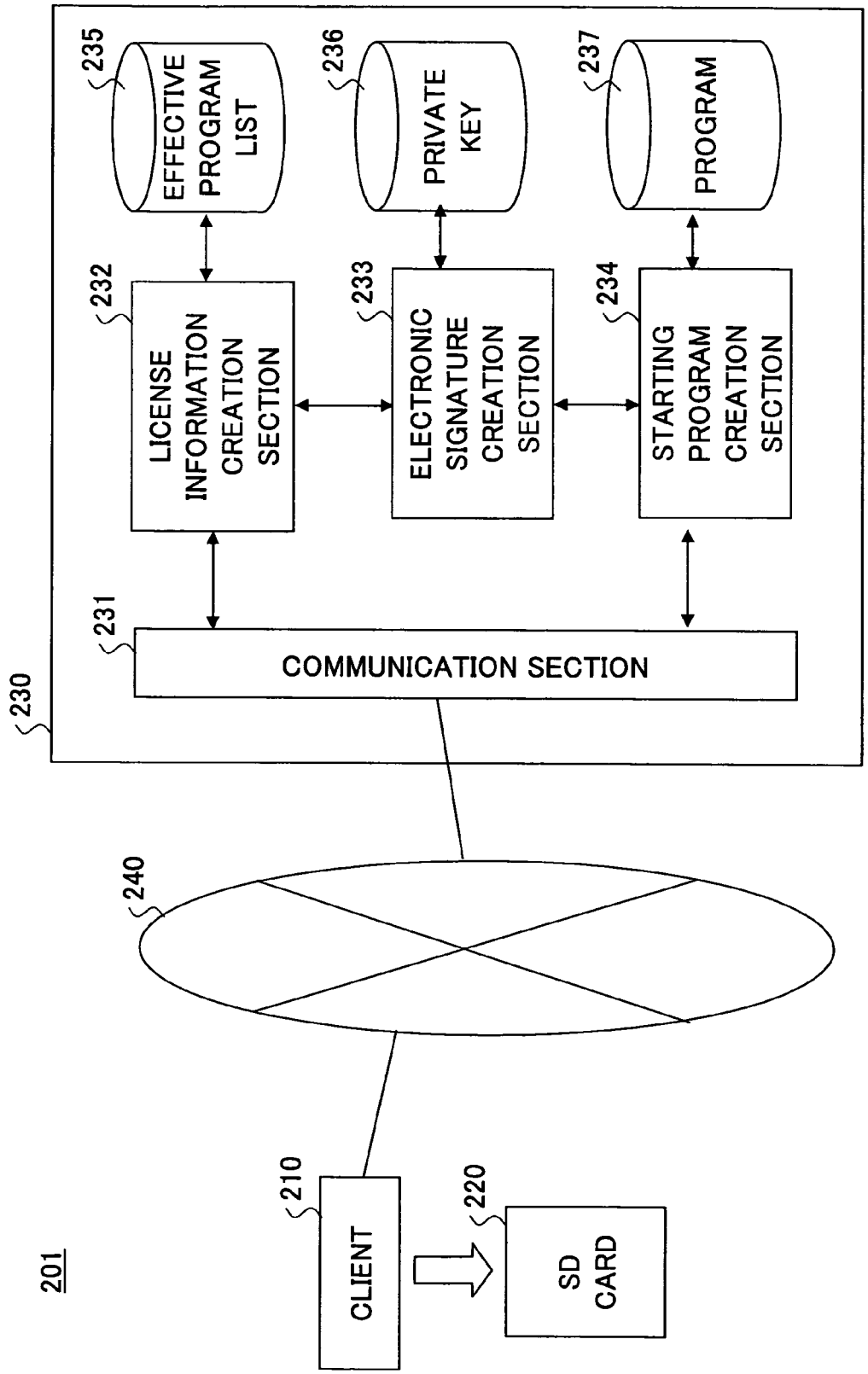
FIG. 12 is a block diagram of a recording-medium creation system for producing a starting SD card.

A description will now be given, with reference to the drawings, of a second embodiment of the present invention. FIG. 12 is a block diagram of a recording-medium creation system for producing an SD card for starting.

In the recording-medium creation system 201 shown in FIG. 12, a client 210 and a recording-medium creation apparatus 230 are connected to each other through a networks 240 such as the Internet or a local area network (LAN).

The client 210 has an SD card slot into which the SD card 220 can be removably inserted. The client 210 receives license information and a starting program from the recording-medium creation apparatus 230 through the network 240, as mention later, and records the received license information and starting program on the SD card 220 inserted in the SD card slot.

The recording-medium creation apparatus 230 comprises a communication section 231, a license information creation section 232, an electronic signature creation section 233, a starting program creation section 234, an effective program list 235, a private key 236 and a program 237. The communication section 231 is provided for enabling the recording-medium creation apparatus 230 to perform data communication with the client 210 through the network 40. The license information creation section 232 produces the license information based on the effective program list 235 and a first electronic signature produced from an SD serial ID of the SD card 220 and the effective program list 235.

The starting program creation section 234 produces the starting program from a second electronic signature, a model number of an information processing apparatus which starts a program from the SD card 220, and the program 237. The second electronic signature is produced from the model number of the information processing apparatus and the program which the information processing apparatus is cause to start, as mentioned later. The electronic signature creation section 233 produces the first electronic signature, by using the private key 236, from the SD serial ID of the SD card 220 and the effective program list 235. The electronic signature creation section 233 also produces the second electronic signature, by using the private key 236, from the program 237, which is started by the information processing apparatus, and the model number of the image forming apparatus, which starts the program from the SD card 220.

Figure 13:
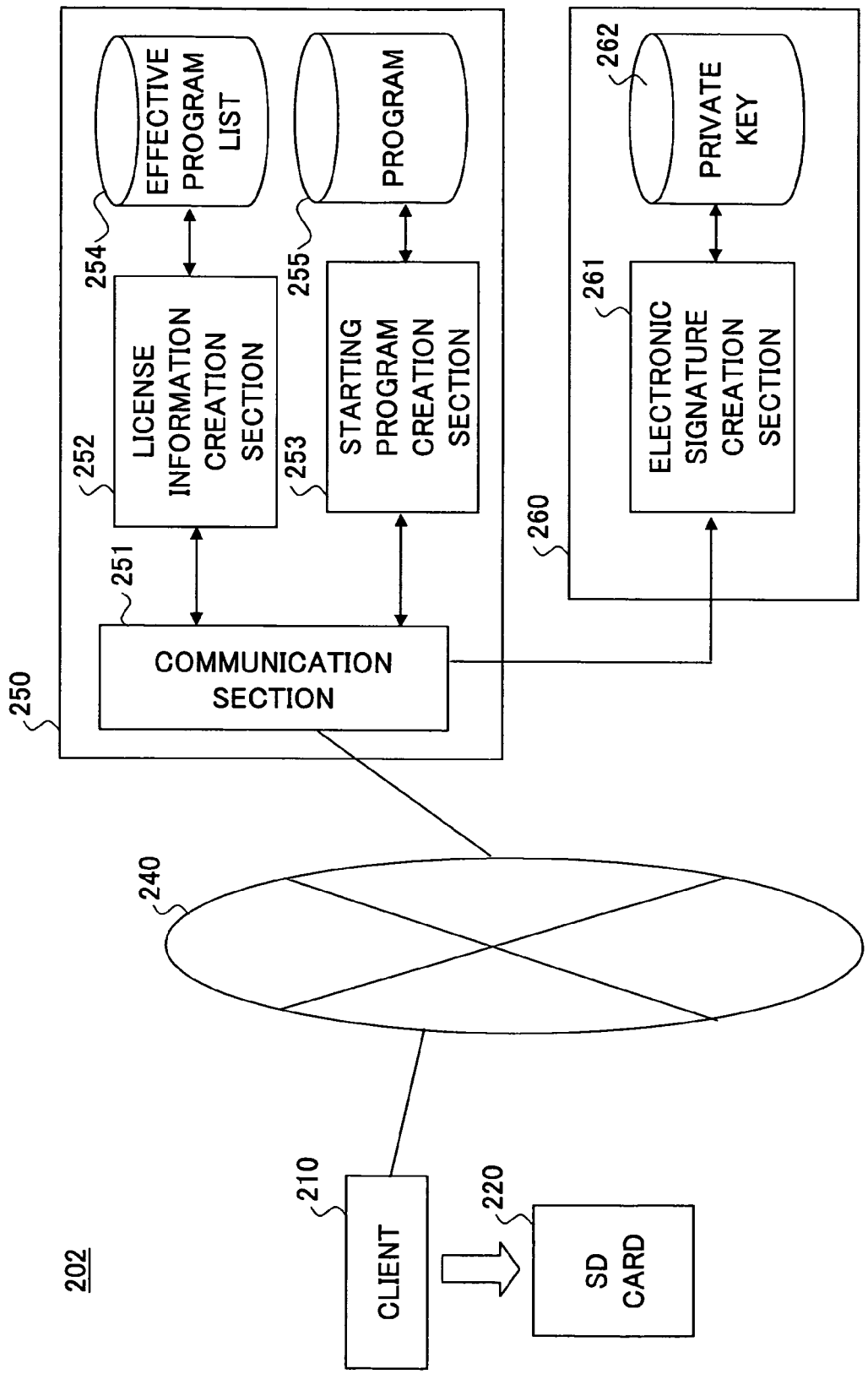
FIG. 13 is a block diagram of another example of the recording-medium creation system for producing a starting SD card.

It should be noted that the recording-medium creation system 1 shown in FIG. 12 may have a structure shown in FIG. 13. FIG. 13 is a block diagram of another example of the recording-medium creation system for producing an SD card for starting. The recording-medium creation system 202 shown in FIG. 13 is differs from the recording-medium creation system 201 shown in FIG. 12 in that the recording-medium creation apparatus is divided into a first recording-medium creation apparatus 250 and a second recording-medium creation apparatus 260.

For example, the first recording-medium creation apparatus 250 comprises a communication section 251, a license information creation section 252 a starting program creation section 253, an effective program list 254 and a program 255. The second recording-medium creation apparatus 260 comprises an electronic signature creation section 261 and a private key 262. Since the communication section 251, the license information creation section 252, the starting program creation section 253, the effective program list 254, the program 255, the electronic signature creation section 261 and the private key 262 shown in FIG. 13 are equivalent to the communication section 231, the license information creation section 232, the starting program creation section 234, the effective program list 235, the program 237, the electronic signature creation section 233 and the private key 236 shown in FIG. 12, respectively, descriptions thereof will be omitted.

Figure 14:
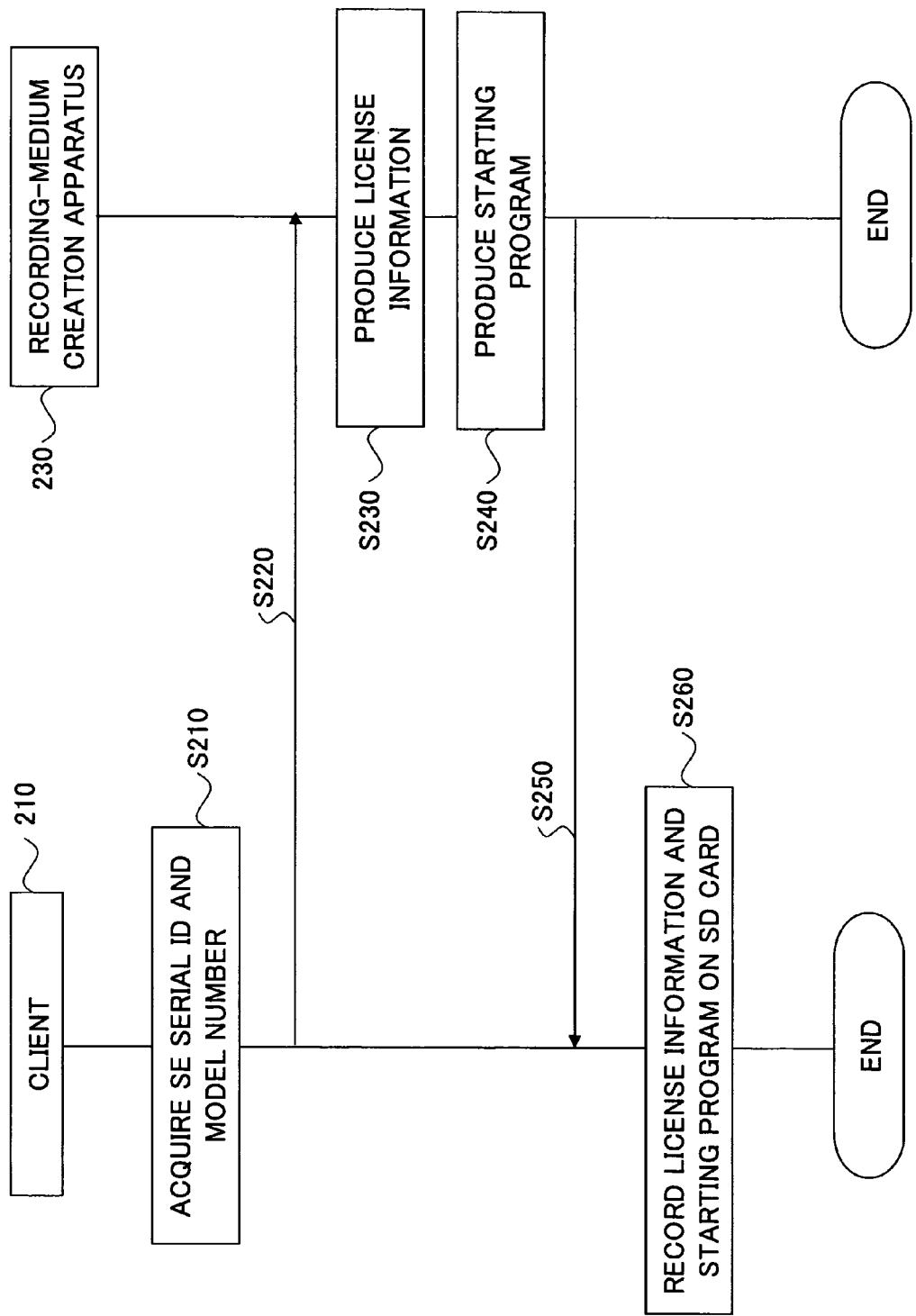
FIG. 14 is a sequence diagram showing a process procedure of the recording-medium creation system.
Figure 15:
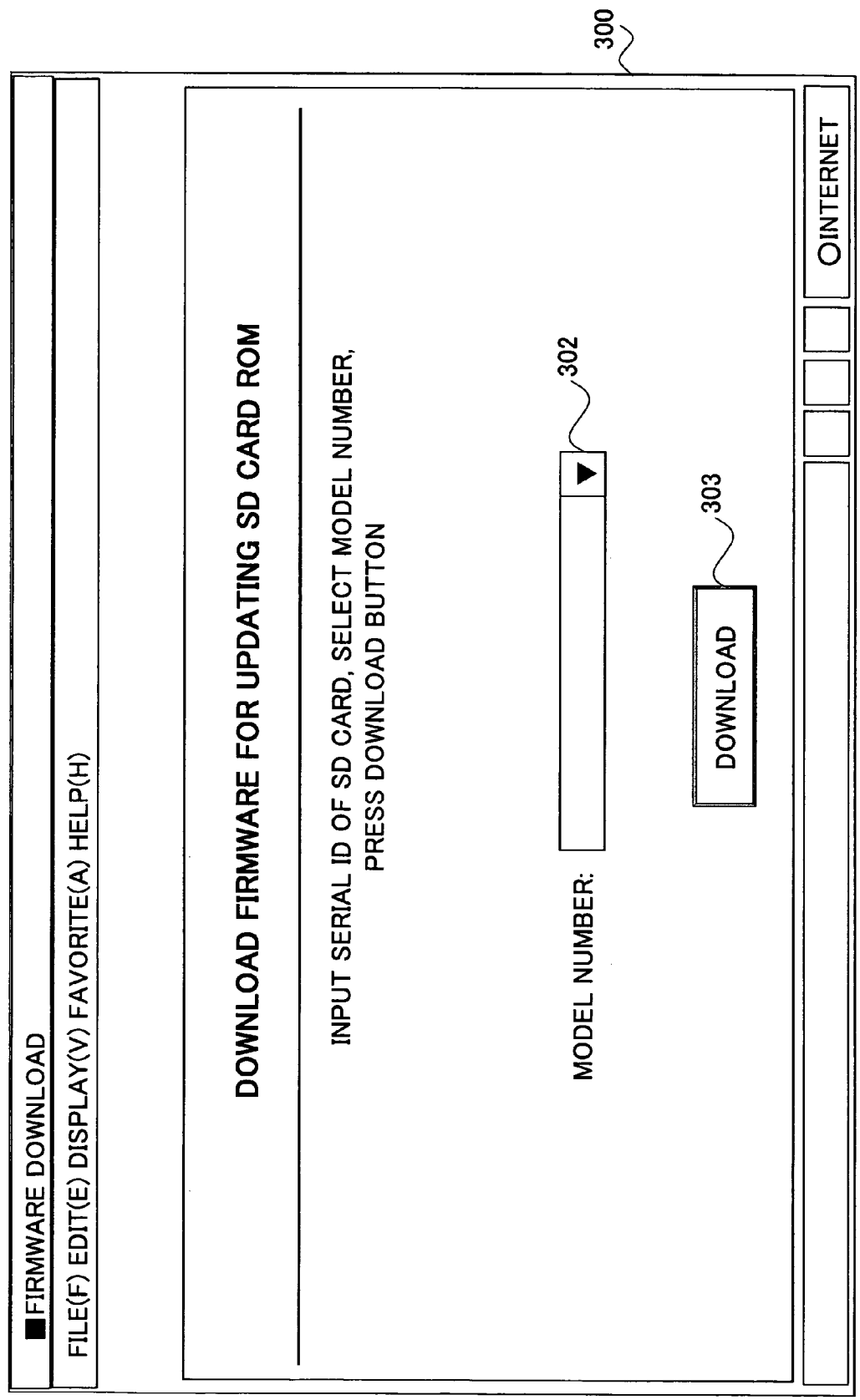
FIG. 15 is an illustration of an input screen displayed on a display device of a client.

A description will now be given, with reference to FIG. 14, of a process procedure of the recording-medium creation system 201 shown in FIG. 12. FIG. 14 is a sequence diagram showing a process procedure of the recording-medium creation system. In step S210, an input screen 300 shown in FIG. 15 is displayed on a display device of the client 210. The input screen 300 has an input column 302 for inputting a model number and a button 303 for instructing a start of download.

A user operates an input device of the client 210 so as to input the model number in the input column 302 and click the button 303. The client 210 automatically reads an SD serial ID from the SD card 220 attached in the SD card slot. When the button 303 is clicked, the process proceeds to step S220 where the client 210 acquires the read SD serial ID and the model number input into input column 302 and sends the acquired SD serial number and model number to the recording-medium creation apparatus 230. After the license information creation section 232 of the recording-medium creation apparatus 230 receives from the client 210 the SD serial ID and the model number through the communication section 231, the process proceeds to step S30 where the license information creation section 232 produces license information using the SD serial ID and the model number.

Figure 16:
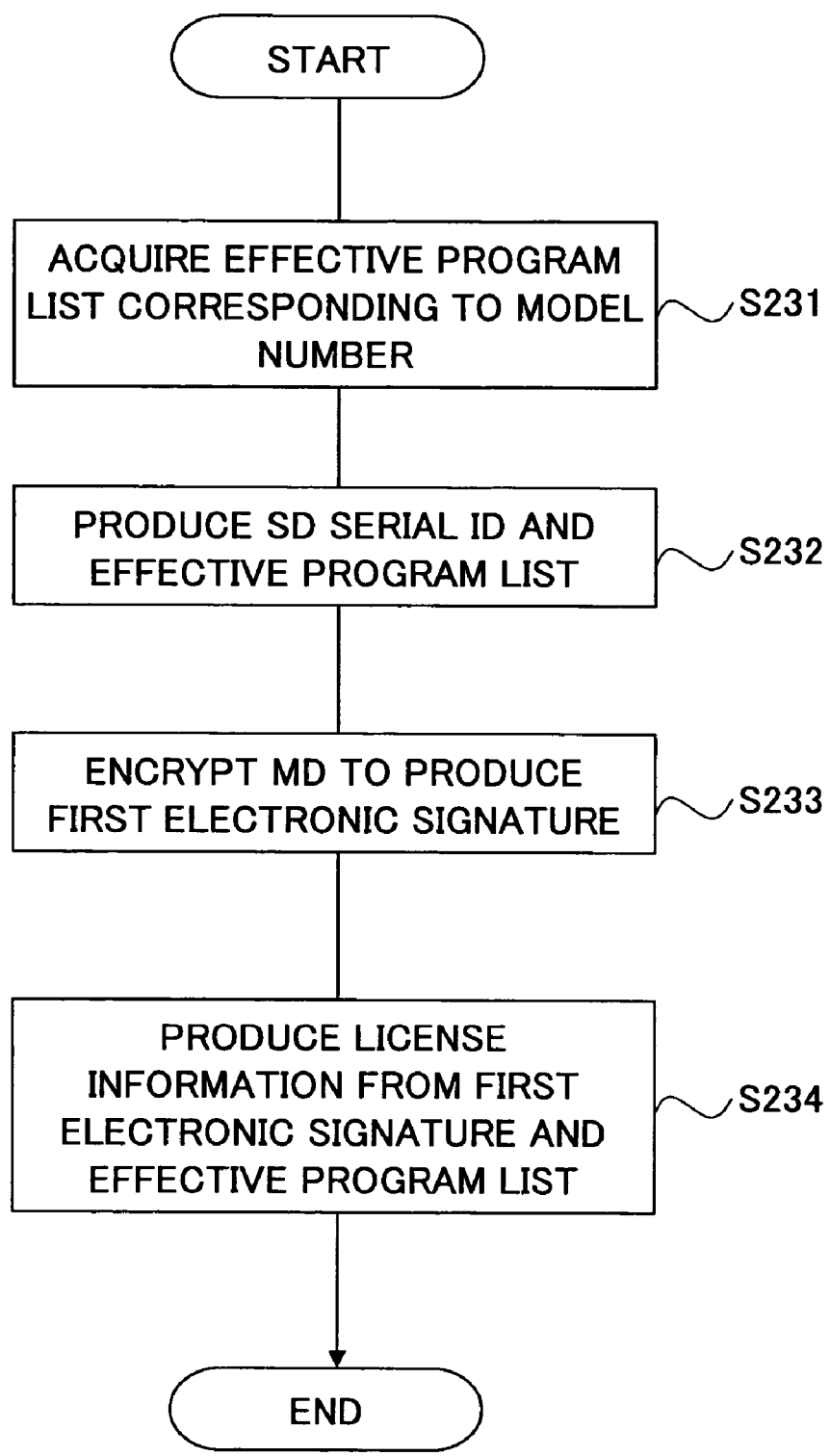
FIG. 16 is a flowchart of a license information creation process.

FIG. 16 is a flowchart of a license information creation process. In step S231, the license information creation section 232 acquires the effective program list 235 corresponding to the model number. The effective program list 235 provides a list of programs that are usable by the information processing apparatus having the model number.

After acquiring the effective program list 235, the license information creation section 232 produces a message digest (hereinafter referred to as MD) from the SD serial ID and the effective program list 235, and sends the produced MD to the electronic signature creation section 233. The electronic signature creation section 233 encrypts the received MD with a private key 236 so as to produce a first electronic signature, and sends the produced first electronic signature to the license information creation section 232. Then, the process proceeds to step S234 where the license information creation section 232 receives the first electronic signature from the electronic signature creation section 233, and produces the license information from the effective program list 235 acquired in step S231 and the received first electronic signature.

Returning to FIG. 14, when the starting program creation section 234 receives the model number from the client 210 through the communication section 231, the process proceeds to step S240 where the starting program creation section 234 produces a starting program using the model number.

Figure 17:
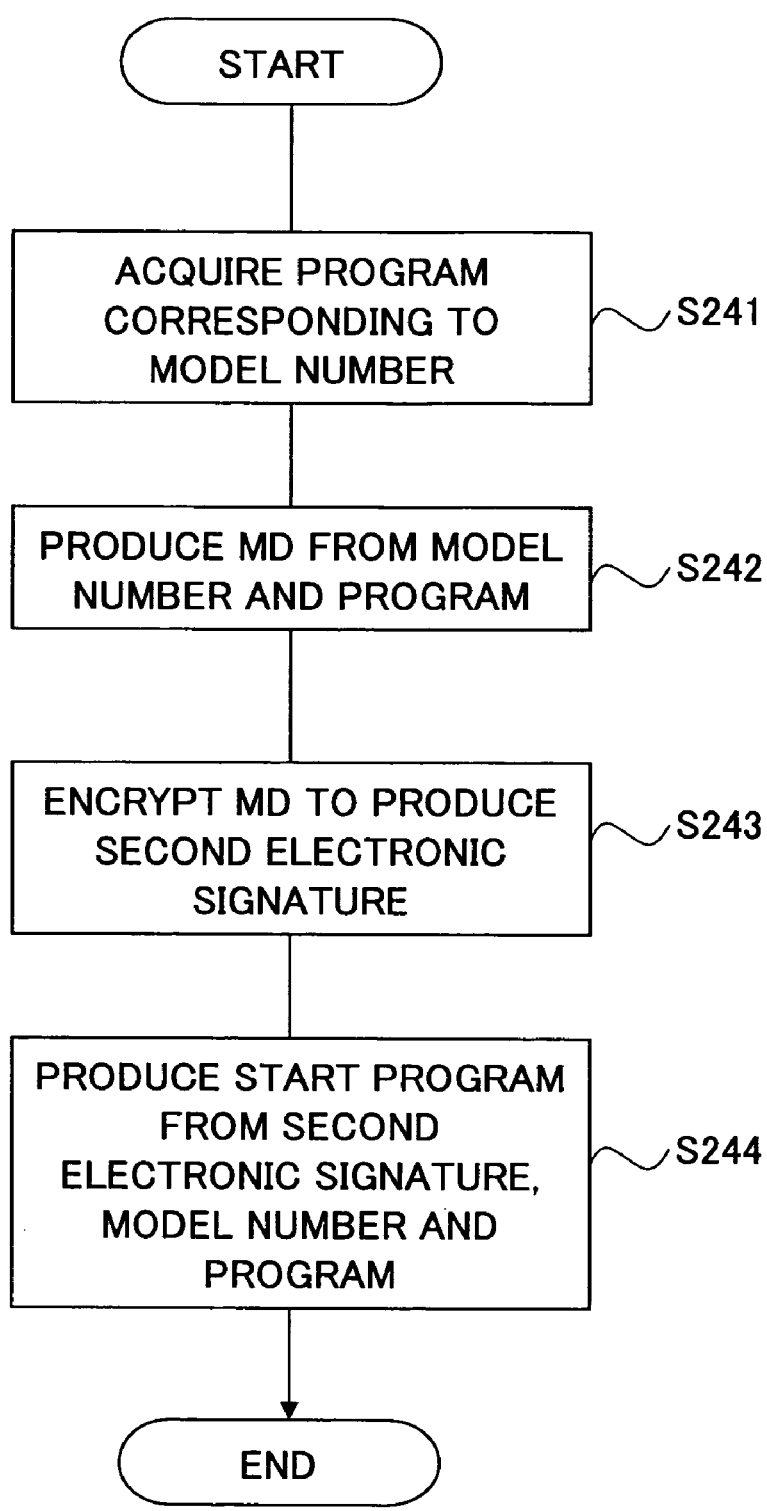
FIG. 17 is a flowchart of a starting program creation process.

FIG. 17 is a flowchart of a starting program creation process. In step S241, the starting program creation section 234 acquires the program 237 corresponding to the model number. The program 237 is a binary file, which can be used by the information processing apparatus having the model number concerned.

After the starting program creation section 234 acquires the program 237, the process proceeds to step S342 where the starting program creation section 234 produces an MD from the model number and the program 237, and sends the produced MD to the electronic signature creation section 233. Then, the electronic signature creation section 233 encrypts the received MD with the private key 236, and produces a second electronic signature. The electronic signature creation section 233 sends the produced second electronic signature to the starting program creation section 234. Then, the process proceeds to step S244 where the starting program creation section 234 receives the second electronic signature from the electronic signature creation section 233, and produces a starting program from the program 237 acquired in step S241, the model number and the second electronic signature.

Returning to FIG. 14, after the license information creation section and the starting program creation section 234 of the recording-medium creation apparatus 230 produce the license information and the starting program, respectively, the process proceeds to step S250 where the license information and the starting program are sent to the client 210 via the communication section 231. Then, the process proceeds to step S260 where the client 210 records the license information and the starting program, which were received from the recording-medium creation apparatus 230, on the SD card 220 inserted into the SD card slot.

Figure 18:
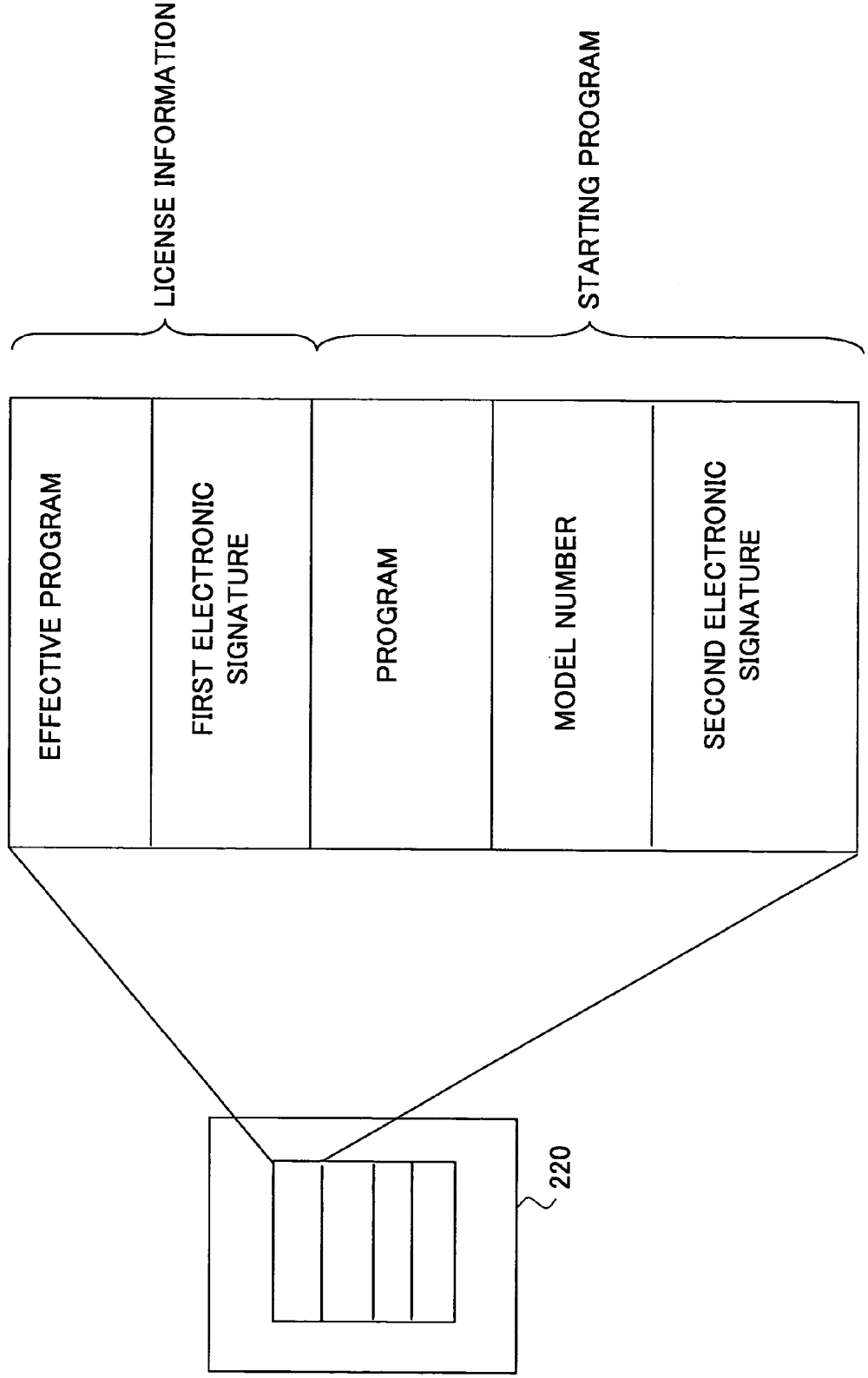
FIG. 18 is a block diagram of an example of the starting SD card.

According to the process procedure shown in the sequence chart of FIG. 14, the SD card for starting as shown in FIG. 18 is produced. FIG. 18 is a block diagram of an example of the SD card for starting. As shown in FIG. 18, the license information and the starting program are recorded on the SD card for starting. In the SD card for starting shown in FIG. 18, one piece of license information corresponds to one starting program. That is, one program is started based on one piece of license information.

Figure 19:
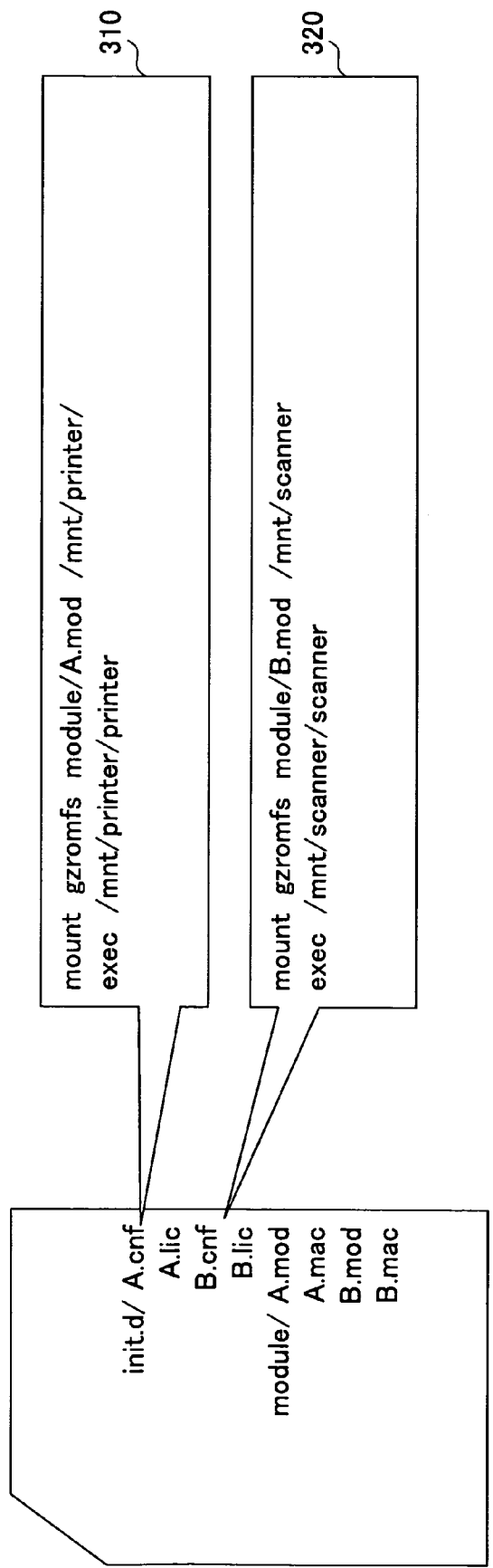
FIG. 19 is an illustration of an example of the license information and the starting program recorded on the starting SD card.

FIG. 19 is an illustration of an example of the license information and the starting program recorded on an SD card for starting. The SD card for starting (hereinafter, referred to as a starting SD card) shown in FIG. 19 expresses the license information and the starting program for starting programs A and B.

The license information for starting the program A consists of "A.cnf" and "A.lic" recorded in a directory "init.d". "A.cnf" expresses the setting file 310. "A.lic" expresses the electronic signature file used for the authentication check on the setting file "A. cnf". For example, the setting file 310 expresses a process of mounting the program "module/A.mod" of a ROMFS format, which has been gzip-compressed, to a mount point "/mnt/printer", and executing the mounted program A.

The starting program for starting the program A consists of "A.mod" and "A.mac" recorded in a directory "module". "A.mod" expresses the program A to start. "A.mac" expresses an electronic signature file used for the authentication check on the program A to start.

The license information for starting the program B consists of "B.cnf" and "B.lic" recorded in the directory "init.d". "B.cnf" expresses a setting file 320. "B.lic" expresses an electronic signature file used for the authentication check on the setting file "B.cnf". For example, the setting file 320 expresses a process of mounting the program "module/B.mod" of a ROMFS format, which has been gzip-compressed, to a mount point "/mnt/scanner", and executing the mounted program B.

Moreover, the starting program for starting the program B consists of "B.mod" and "B.mac" recorded in the directory "module". "B.mod" expresses the program B to start. "B.mac" expresses an electronic signature file used for the authentication check on the program B to start.

It should be noted that although the model number is included in the starting program recorded on the starting SD card shown in FIG. 19, the model number may be expressed in a different file.

Figure 20:
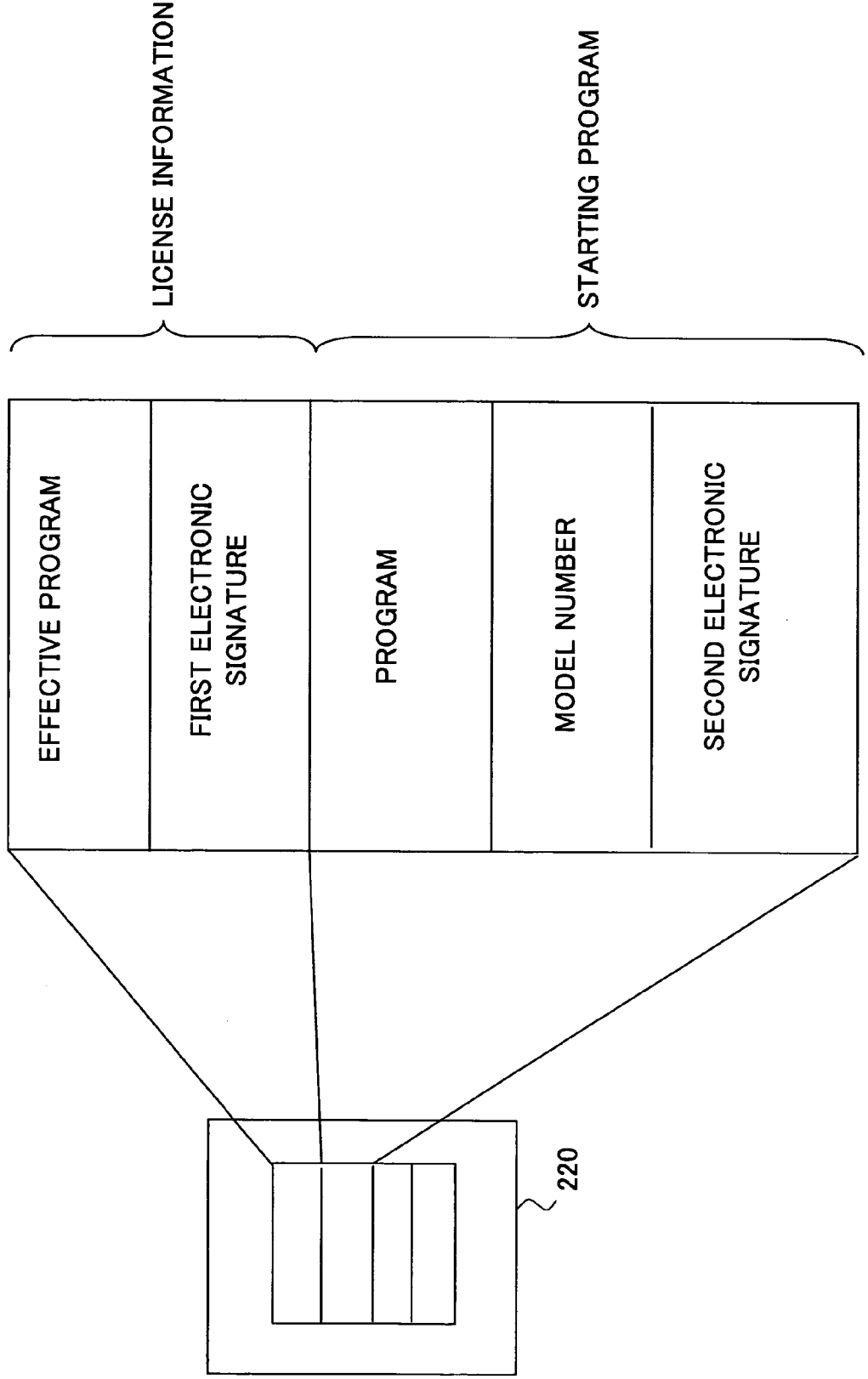
FIG. 20 is a block diagram of another example of the starting SD card.

Additionally, although one piece of license information corresponds to one starting program in the starting SD card shown in FIG. 18, one piece of license information may correspond to a plurality of starting programs as shown in FIG. 20. That is, a plurality of programs can be started based on one piece of license information. FIG. 20 is a block diagram of another example of the starting SD card. The starting SD card shown in FIG. 20 consists of one piece of license information and a plurality of starting programs.

Figure 21:
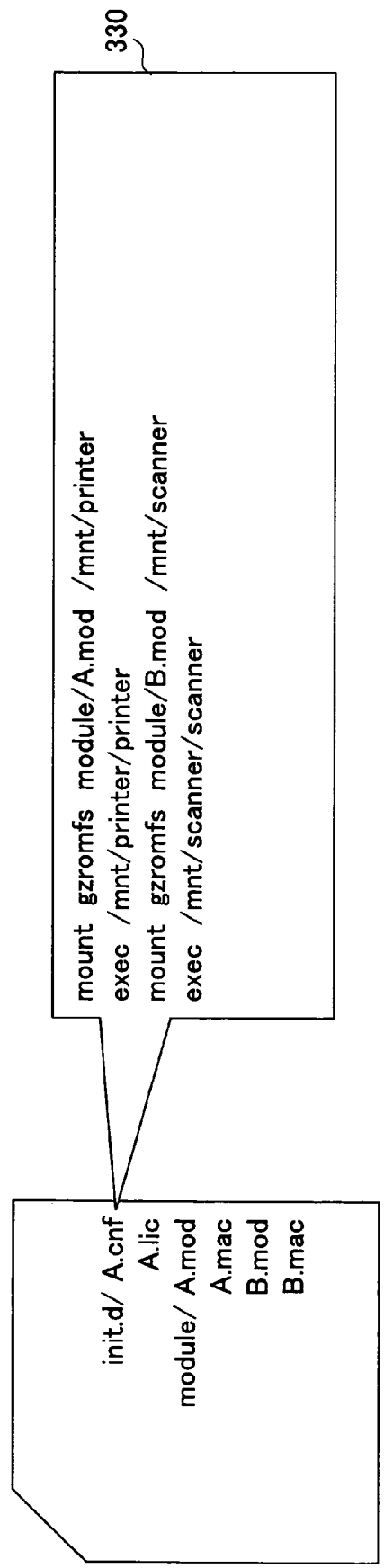
FIG. 21 is an illustration of license information and a starting program recorded on the starting SD card.

FIG. 21 is an illustration of another example of the license information and the starting program recorded on the starting SD card. In the starting SD card shown in FIG. 10, one piece of license information starts programs A and B. For example, a setting file "A.cnf" represents a setting file 330. The setting file 330 describes a process of mounting a gzip-compressed program "module/A.mod" of ROMFS format to a mount point "/mnt/printer" and executing the mounted program A, and a process of mounting a gzip-compressed program "module/B.mod" of ROMFS format to a mount point "/mnt/scanner" and executing the mounted program B. Other files are the same as the license information and start program, which are recorded on the starting SD card shown in FIG. 19, and descriptions thereof will be omitted.

Figure 22:
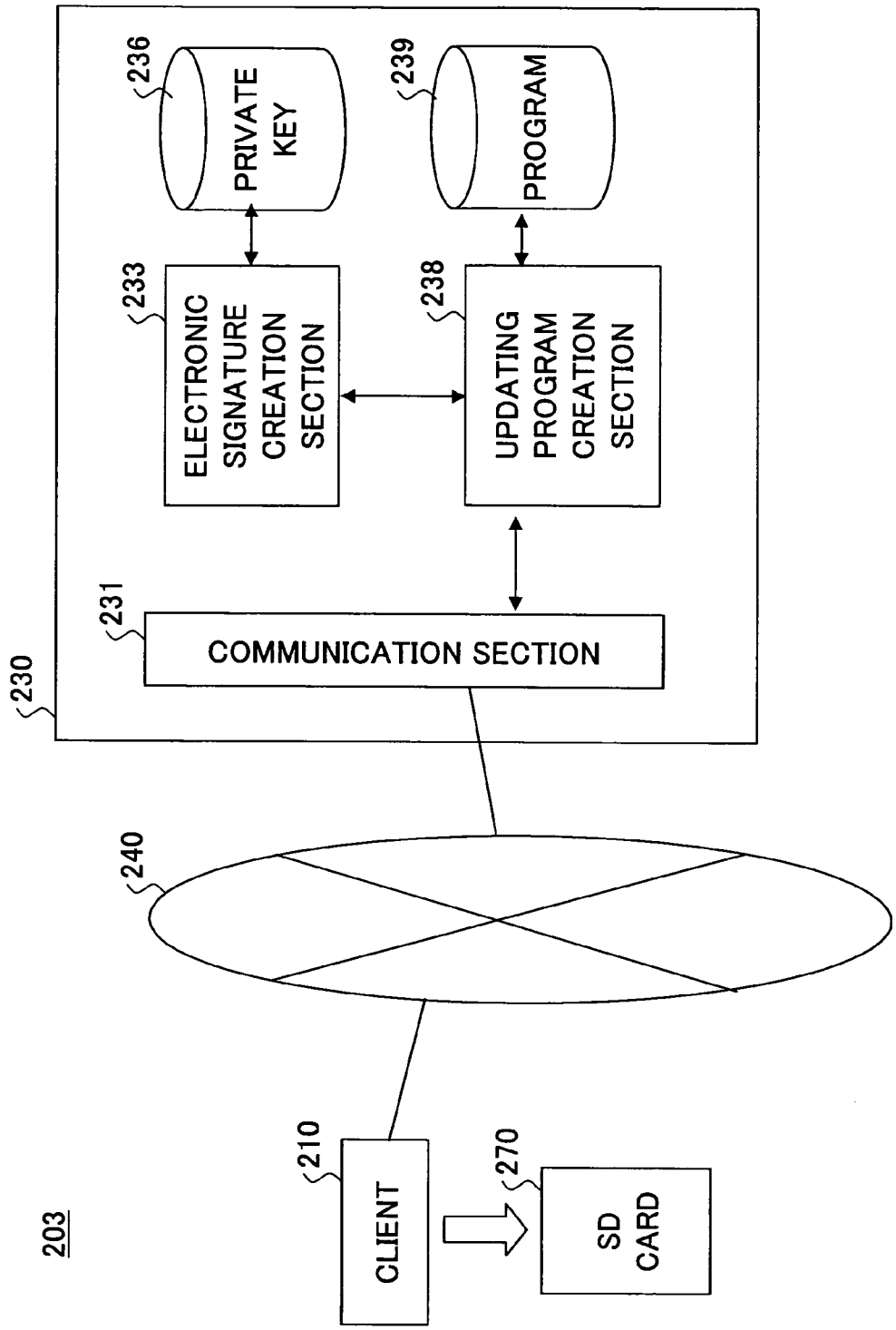
FIG. 22 is a block diagram of an example of the recording-medium creation system for producing the updating SD card.

A description will now be given, with reference to FIG. 22, of a recording-medium creation system for producing an SD card for updating the starting SD card. Hereinafter such an SD card for updating may be referred to as an updating SD card. FIG. 22 is a block diagram of an example of the recording-medium creation system for producing the updating SD card. In the recording-medium creation system 203, a client 210 and a recording-medium creation apparatus 230 are connected to each other through a network 240. The client 210 has an SD card slot into which an SD card 270 can be removable inserted. The client 210 receives an updating program from the recording-medium creation apparatus 230 through the network 240, and records the updating program on the SD card 270 inserted into the SD card slot.

The recording-medium creation apparatus 230 comprises a communication section 231, an electronic signature creation section 233, a private key 236, an updating program creation section 238 and a program 239. The communication section 231 is provided for enabling the recording-medium creation apparatus to perform data communication with the client 210 through the network 240.

The updating program creation section 238 produces an updating program based on an electronic signature, a model number of an information processing apparatus and the program 239. The electronic signature is produced from the model number of the information processing apparatus, which starts the starting SD card, and the program 239, which updates the starting SD card. The electronic signature creation section 233 produces the electronic signature from the model number and the program 239 using the private key 236 as mentioned later.

Figure 23:
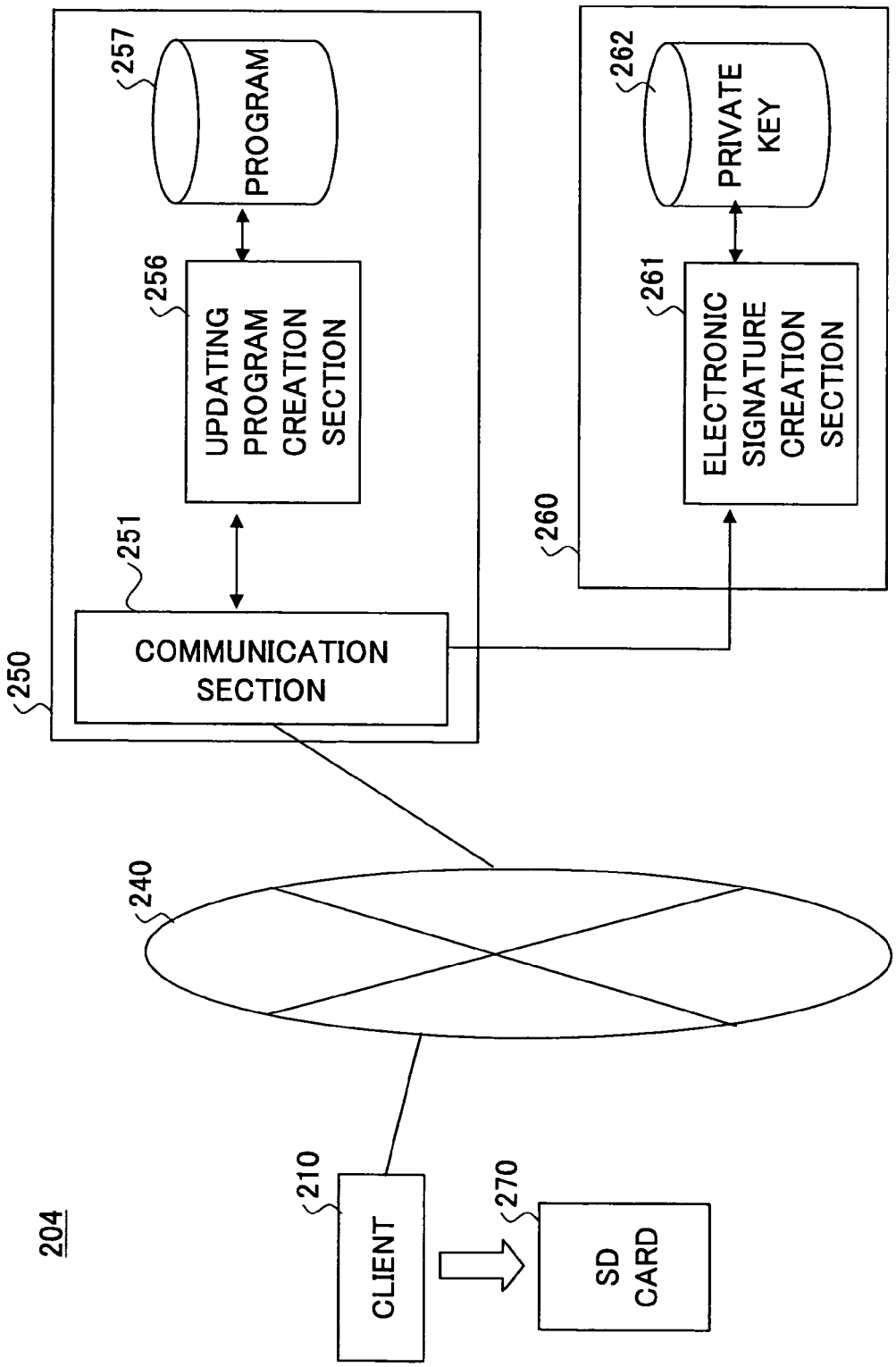
FIG. 23 is a block diagram of another example of the recording-medium creation system for producing then updating SD card.

It should be noted that the recording-medium creation system 203 of FIG. 22 may be of a structure shown in FIG. 23. FIG. 23 is a block diagram of another example of the recording-medium creation system for producing an updating SD card. The recording-medium creation system 204 differs from the recording-medium creation system 203 in that the recording-medium creation apparatus is divided into a first recording-medium creation apparatus 250 and a second recording-medium creation apparatus 260.

The first recording-medium creation apparatus 250 comprises a communication section 251, an updating program creation section 256 and a program 257. The second recording-medium creation apparatus 260 has an electronic signature creation section 261 and a private key 262.

The communication section department 251, the updating program creation section 256, the program 257, the electronic signature creation section 261 and the private key 262 shown in FIG. 23 are equivalent to the communication section 231, the updating program creation section 238, the program 239, the electronic signature creation section 233 and the private key 236 shown in FIG. 22, respectively, and descriptions thereof will be omitted.

Figure 24:
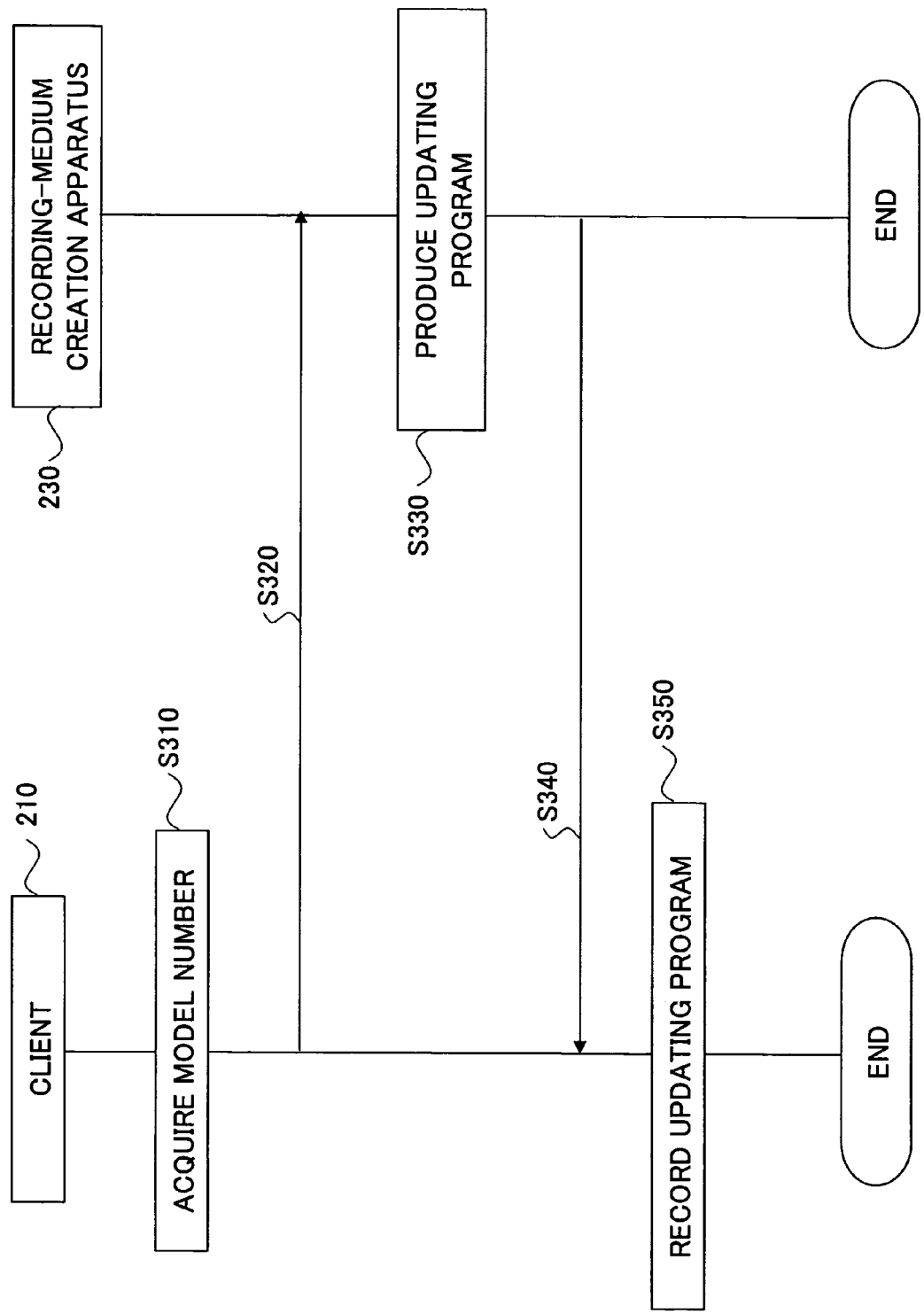
FIG. 24 is a sequence diagram of a process procedure of the recording-medium creation system.

A description will now be given, with reference to FIG. 24, of a process procedure of the recording-medium creation system 203 shown in FIG. 22. FIG. 24 is a sequence diagram of a process procedure of the recording-medium creation system.

In step S310, an input screen provided with an input column for inputting a model number and a button for instructing a start of a downloading operation is displayed on the display unit of the client 210. A user inputs a model number into the input column by operating the input device and clicks the button for instructing a start of a downloading operation. When the button is clicked, the process proceeds to step S320 where the client 210 acquires the model number input in the input column and sends the acquired model number to the recording-medium creation apparatus creation apparatus 230.

After the updating program creation section 238 of the recording-medium creation apparatus 230 receives the model number from the client 210 through the communication section 231, the process proceeds to step S330 where the updating program creation section 238 produces an updating program.

Figure 25:
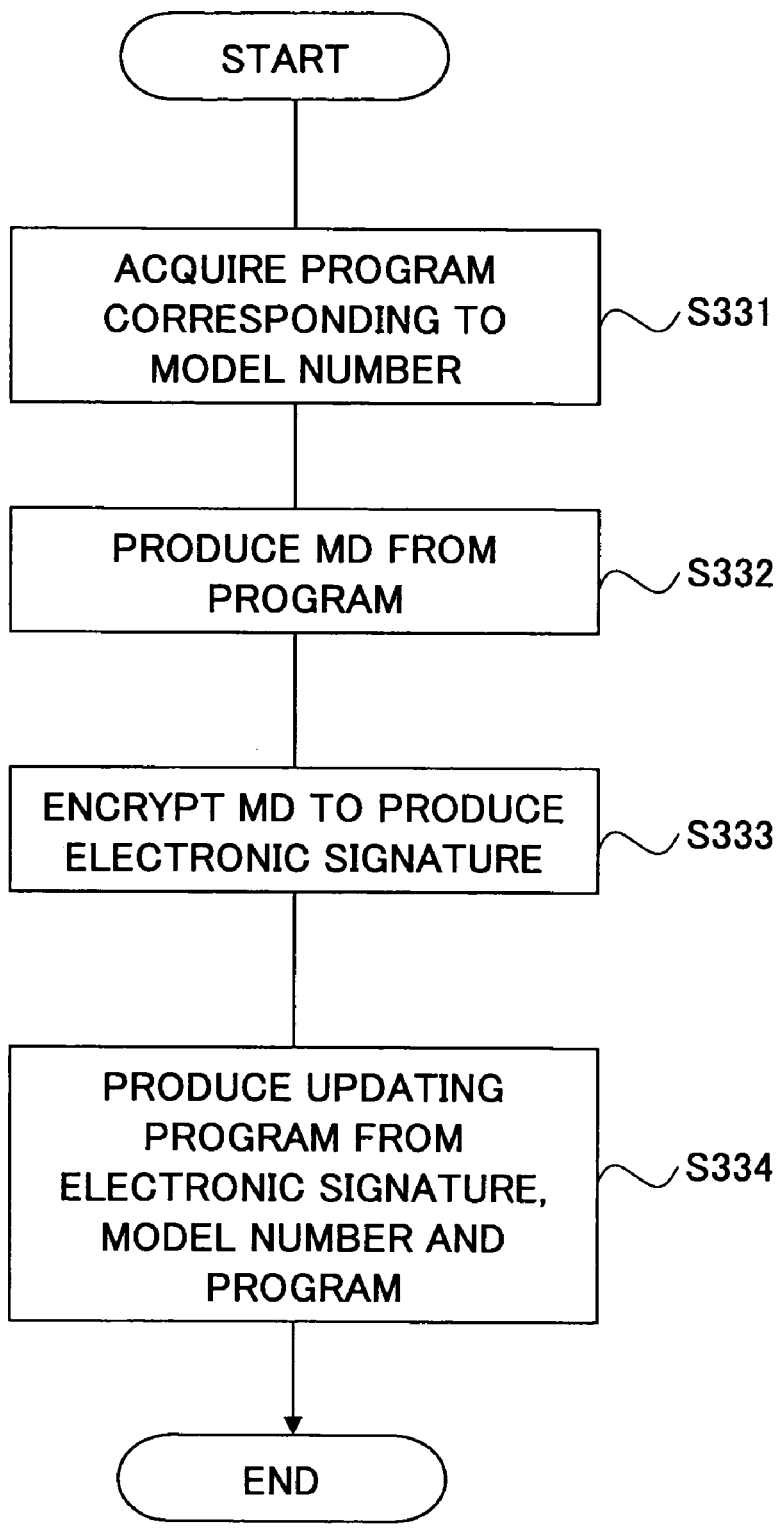
FIG. 25 is a flowchart of an example of an updating program creation process.

FIG. 25 is a flowchart of an example of an updating program creation process. In step S331, the updating program creation section 238 acquires the program 239 corresponding to the received model number. The program 239 is a binary file, which is usable by an information processing apparatus corresponding to the model number concerned.

Then, the process proceeds to step S332 where the updating program creation section 238 produces an MD from the program 239, and sends the produced MD to the electronic signature creation section 233. The electronic signature creation section 233 encrypts the received MD with the private key 236 so as to produce an electronic signature. The electronic signature creation section 233 sends the produced electronic signature to the updating program creation section 238.

Then, the process proceeds to step S334 where the updating program creation section 238 receives the electronic signature from the electronic signature creation section 233, and produces an updating program from the electronic signature, the model number and the program 239 acquired in step S331.

Returning to FIG. 24, after the updating program creation section 238 of the recording-medium creation apparatus 230 produces the updating program, the process proceeds to step S340 where the updating program creation section 238 sends the updating program to the client 210 through the communication section 31. Then, the process proceeds to step S350 where the client 210 records the updating program received from the recording-medium creation apparatus 230 on the SD card 270 inserted into the SD card slot.

Figure 26:
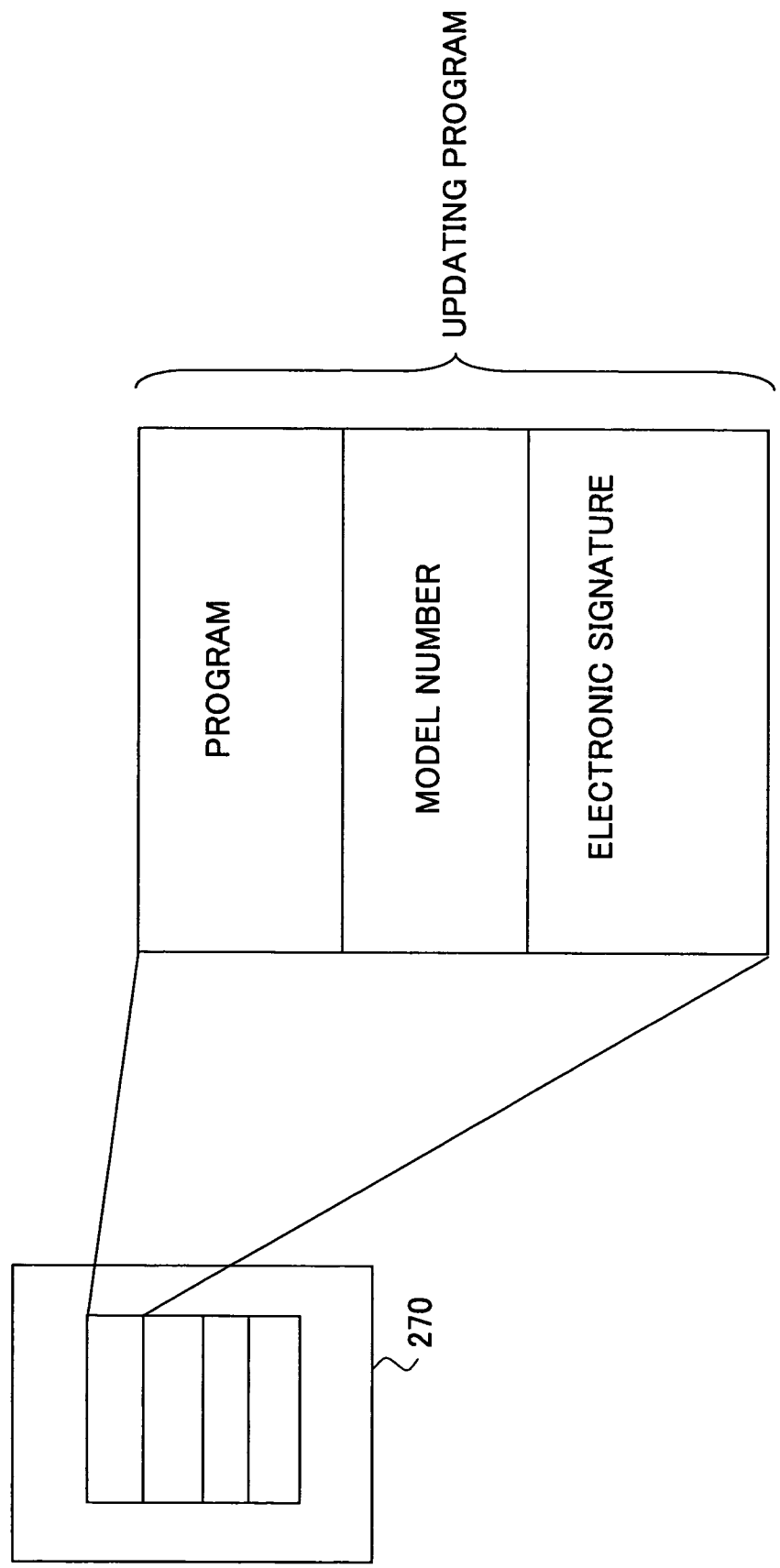
FIG. 26 is a block diagram of an example of the updating SD card.

According to the process procedure shown in FIG. 24, the updating SD card shown in FIG. 26 is produced. FIG. 26 is a block diagram of an example of the updating SD card. As shown in FIG. 26, the updating program is recorded on the updating SD card. The starting SD card and the updating SD card mentioned above are inserted into an SD card slot provided in an information processing apparatus or a combination apparatus and used for starting a program or updating a program.

Figure 27:
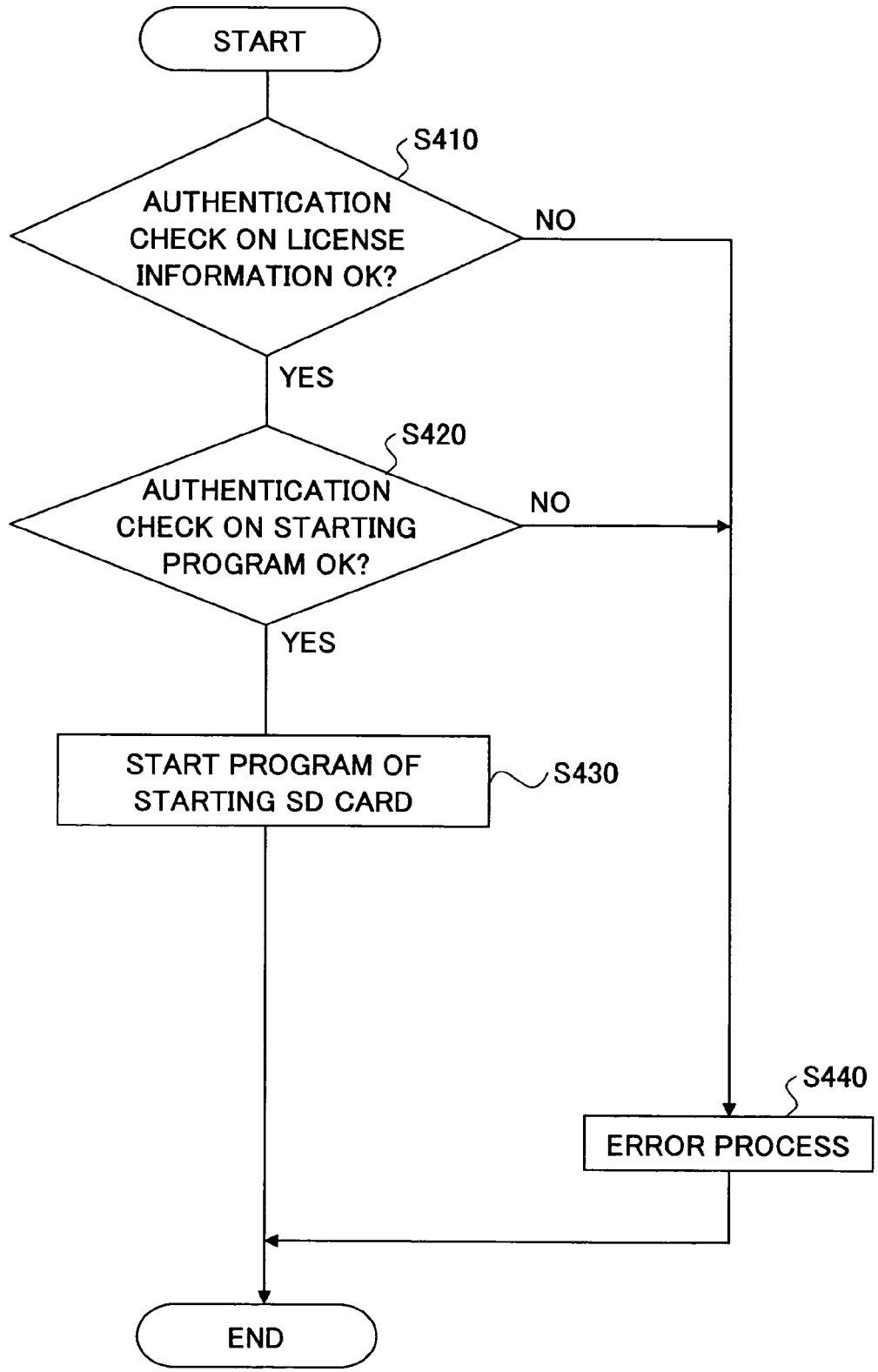
FIG. 27 is a flowchart of a process of starting a program from a starting SD card.

A description will be given below, with reference to FIG. 27, of a process when the starting SD card or the updating SD card is inserted into a combination machine. FIG. 27 is a flowchart of a process of starting a program from a starting SD card.

In step S410, the combination machine reads license information from the starting SD card inserted in the SD card slot, and perform an authentication check on the license information. If it is determined that the result of the authentication check on the license information is good (OK) (YES of step S410), the process of the combination machine proceeds to step S420. On the other hand, if it is determined that the result of the authentication check on the license information is not good (NG) (NO of step S410), the process of the combination machine proceeds to step S440 where an error process is performed, and, then, the process is ended.

In step S420, the combination machine reads the starting program from the starting SD card inserted in the SD card slot, and performs an authentication check on the starting program as mentioned later. If it is determined that the result of the authentication check on the starting program is good (OK) (YES of step S420), the process of the combination machine proceeds to step S430. On the other hand, if it is determined that the result of the authentication check on the starting program is not good (NG) (NO of step S420), the process of the combination machine proceeds to step S240 where the error process is performed, and, then, the process is ended.

In step S430, since both the authentication check on the license information and the authentication check on the starting program are good (OK), the combination machine starts the program recorded on the starting SD card, and, then, the process is ended. For example, the authentication check on the license information is performed in a manner shown in a flowchart of FIG. 28.

Figure 28:
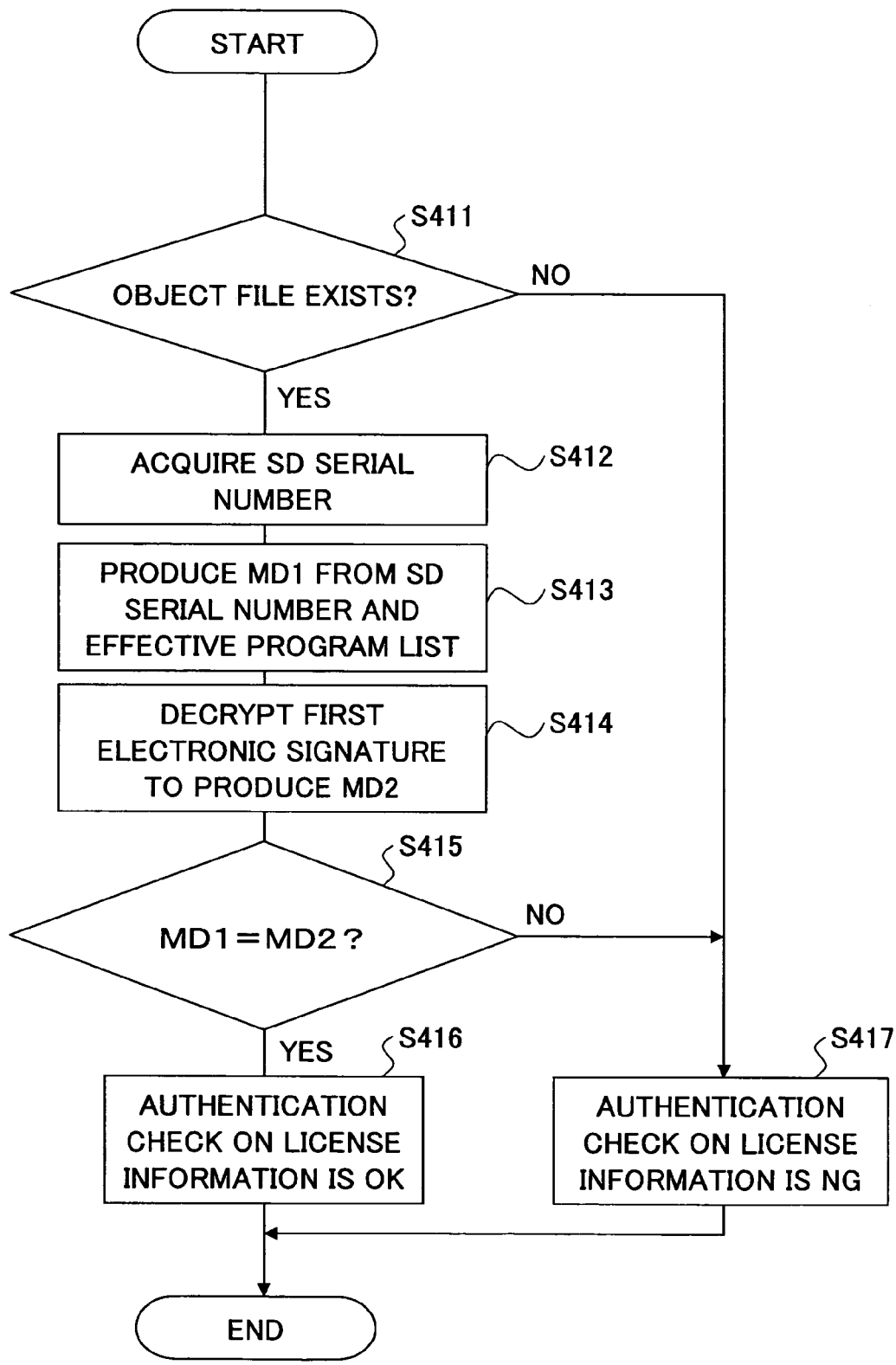
FIG. 28 is a flowchart of a process of performing an authentication check on the license information.

FIG. 28 is a flowchart of a process of performing an authentication check on the license information. In step S411, the combination machine determines whether or not the object file, which the combination machine uses for the authentication check on license information, exists in the starting SD card. The object file used for the authentication check on the license information contains an effective program list and a first electronic signature.

If it is determined that the object file used for the authentication check on the license information exists (YES of step S411), the combination machine acquires the effective program list and the first electronic signature from the starting SD card, and the process proceeds to step S412. In step S412, the combination machine acquires an SD serial ID from the starting SD card. Then, the process proceeds to step S413 where the combination machine produces an MD based on the effective program list acquired in step S411 and the SD serial ID acquired in step S412.

Thereafter, the process proceeds to step S414 where the combination machine decrypts the first electronic signature acquired in step S414 with a public key. Then, the process proceeds to step S415 where the combination machine determines whether or not the MD1 produced in step S413 is equal to the MD2 produced in step S414. If it is determined that the MD1 produced in step S413 is equal to the MD2 produced in step S414 (YES of S415), the process of the combination machine proceeds to step S416 where a determination is made that the result of the authentication check on the license information is good (OK). On the other hand, if it is determined that the MD1 produced in step S413 is not equal to the MD2 produced in step S414 (NO of S415), the process of the combination machine proceeds to step S417 where a determination is made that the result of the authentication check on the license information is not good (NG). This is because that if it is determined that the MD1 produced in step S413 is not equal to the MD2 produced in step S414, it is highly possible that the file recorded on the starting SD card has been falsely copied.

It should be noted that if it is determined that there is no object file used for the authentication check on the license information (NO of step S411), the process proceeds to step S417 where the combination machine determines that the result of the authentication check on the license information is not good (NG).

Figure 29:
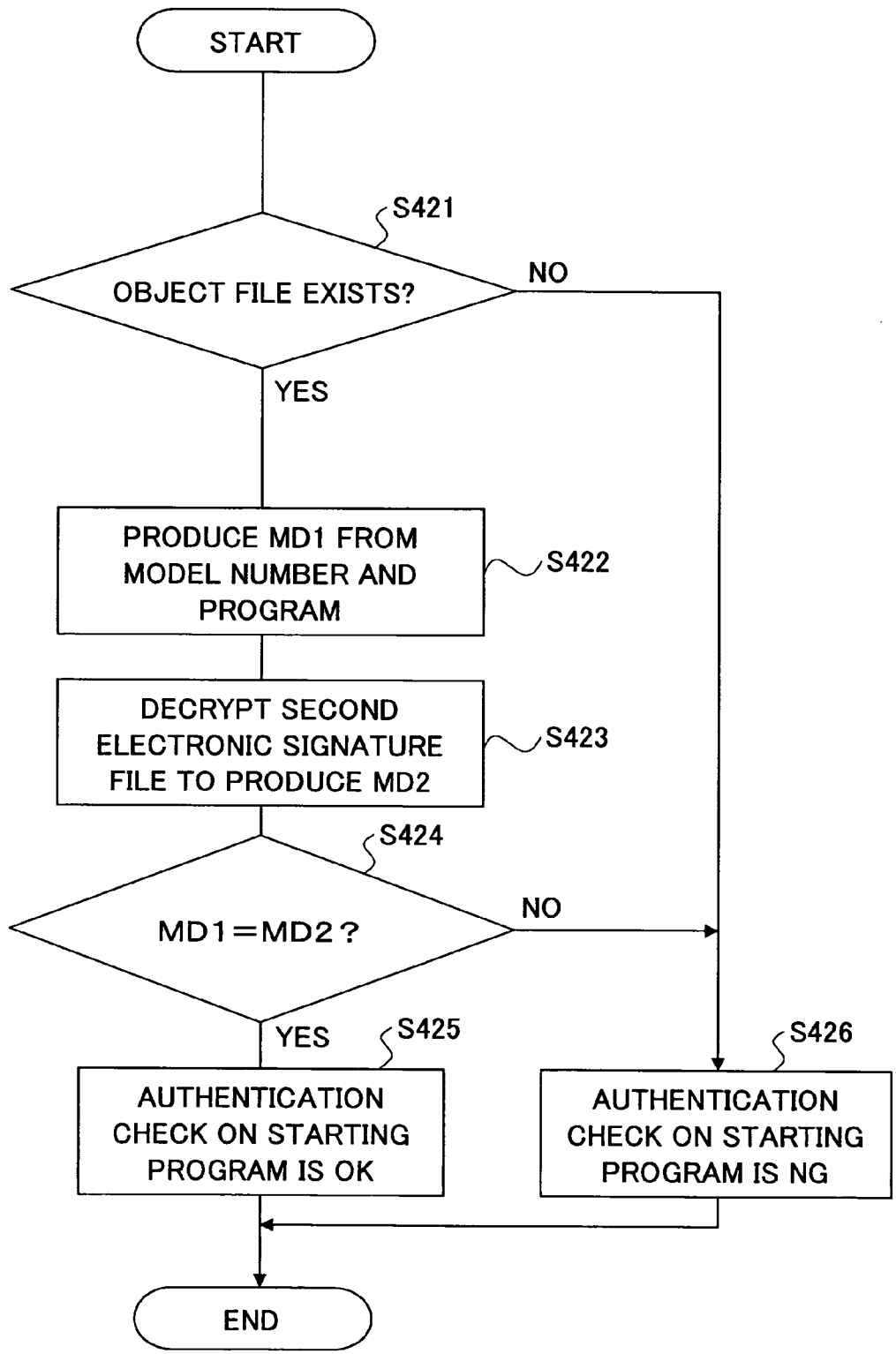
FIG. 29 is a flowchart of a process of performing an authentication check on the starting program.

The authentication check on the starting program is performed according to a flowchart shown in FIG. 29. FIG. 29 is a flowchart of a process of performing the authentication check on the starting program.

In step S421, it is determined whether or not there is an object file which the combination machine uses for the authentication check on the starting program in the starting SD card. The object file used for the authentication check on the starting program contains a program and a second electronic signature. If it is determined that there exists the object file used for the authentication check on the starting program (YES of step S421), the combination machine acquires the program and the second electronic signature from the starting SD card, and then, the process proceeds to step S422.

In step S422, the combination machine produces an MD1 of the program acquired in step S421. Then, the process proceeds to step S423 where the combination machine decrypts the second electronic signature acquired in step S421 with the public key so as to produce an MD2. Then, the process proceeds to step S424 where the combination machine determined whether or not the MD1 produced in step S422 is equal to the MD2 produced in step S423.

If it is determined that the MD1 produced in step S422 is equal to the MD2 produced in step S423 (YES of step S424), the process proceeds to step S425 where the combination machine determines that the result of the authentication check on the starting program is good (OK). On the other hand, if it is determined that the MD1 produced in step S422 is not equal to the MD2 produced in step S423 (NO of step S424), the process proceeds to step S426 where the combination machine determines that the result of the authentication check on the starting program is not good (NG). This is because that if the MD1 produced in step S422 is not equal to the MD2 produced in step S423, it is highly possible that the file recorded o the starting SD card is falsely copied or tampered. It should be noted that if it is determined that there is no object file used for the authentication check on the starting program (NO in step S421), the process proceeds to step S426 where the combination machine makes a determination that the result of the authentication check on the starting program is not good (NG).

Figure 30:
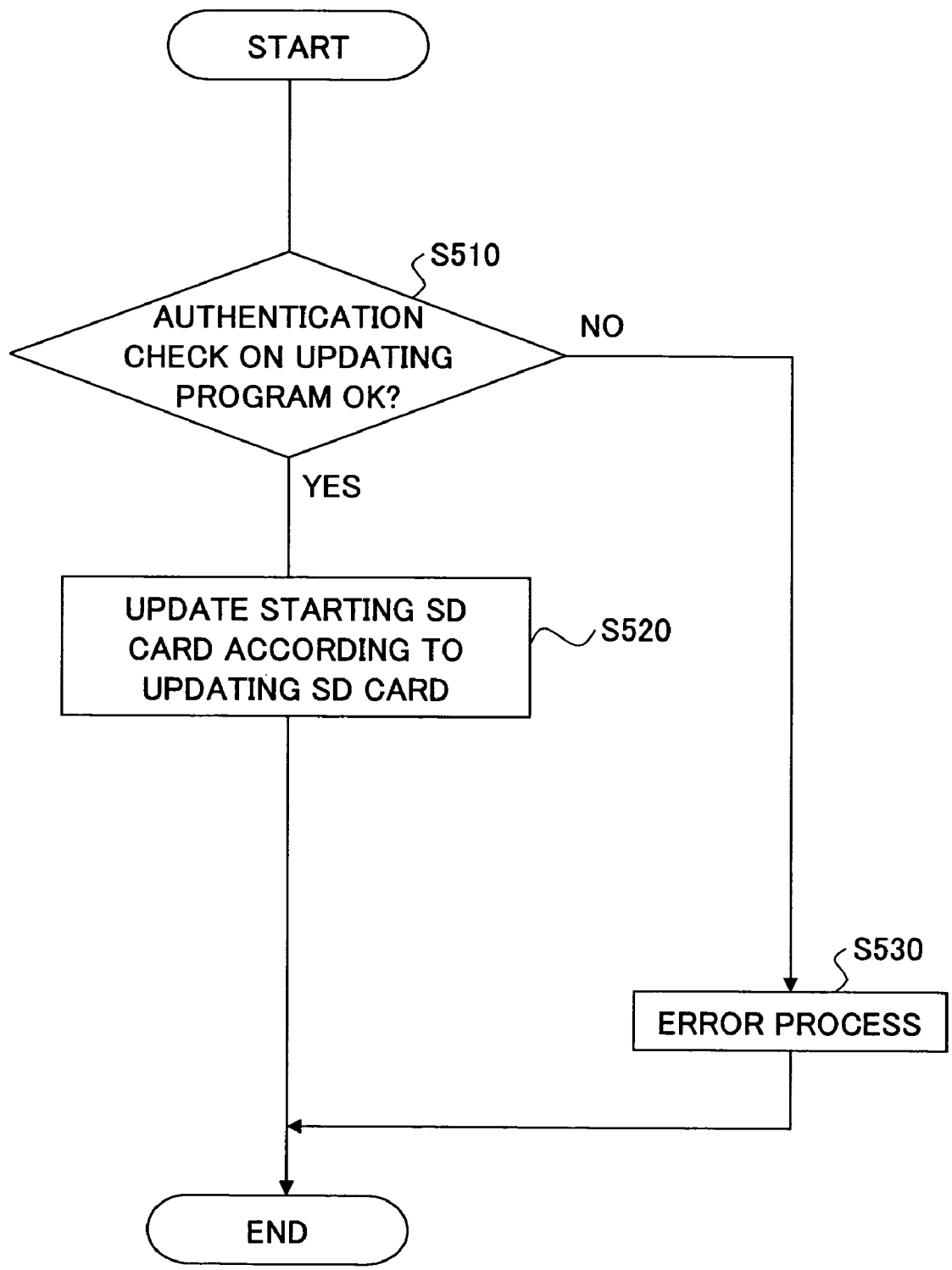
FIG. 30 is a flowchart of a process of updating the starting SD card in accordance with the updating SD card.

FIG. 30 is a flowchart of a process of updating the starting SD card in accordance with the updating SD card. In step S510, the combination machine reads the starting program from the updating SD card inserted in the SD card slot, and performs the authentication check on the updating program according to a flowchart shown in FIG. 30.

If it is determined that the result of the authentication check on the updating program is good (OK) (YES of step S510), the process of the combination machine proceeds to step S520. On the other hand, if it is determined that the result of the authentication check on the updating program is not good (NG) (NO of step S510), the process of the combination machine proceeds to step S530 where an error process is performed, and, then, the process is ended. That is, the combination machine ends the process without updating starting SD card inserted in a different SD card slot.

On the other hand, in step S520, the combination machine updates the SD card inserted in the different SD card slot using the program recorded on the updating SD card since the result of the authentication check on the updating program was good (OK), and then, the process is ended. The starting SD card and the updating SD card according to the preset invention can record the license information and the starting program, of which credibility can be easily checked. Therefore, a start or an update of a program from a removal recording medium such as an SD card can be performed while a security of a program recorded on the removable recording medium is well-maintained.

The present invention is not limited to the specifically disclosed embodiments, and variations and modifications may be made without departing from the scope of the present invention.

The present application is based on Japanese patent applications No. 2003-076607 filed Mar. 19, 2003, No. 2003-076680 filed Mar. 19, 2003, No. 2004-70193 and No. 2004-70194, the entire contents of which are hereby incorporated by reference.

What is claimed is:

1. An information processing apparatus comprising:
   a detector that detects a recording medium to be positioned to be set in an accessible state;
   a recording-medium starting section that activates the recording medium detected by said detector to activate the accessible state; and
   a computer software program starting section that performs an authentication check on said recording medium activated by the recording-medium starting section, reads a computer software program from said recording medium only when a result of the authentication check is normal, and starts an execution of said computer software program.

2. The information processing apparatus as claimed in claim 1, wherein said computer software program starting section reads a file used for the authentication check from said recording medium set in the accessible state by said recording-medium starting section so as to perform the authentication check by using said file.

3. The information processing apparatus as claimed in claim 1, wherein said program starting section performs the authentication check on both a setting file recorded on said recording medium and on the computer software program to be read.

4. The information processing apparatus as claimed in claim 3, wherein the authentication check on said setting file is performed using an electronic signature produced from the setting file and identification information of said recording medium.

5. The information processing apparatus as claimed in claim 4, wherein the authentication check on said setting file is performed based on a comparison between a first message and a second message, the first message being based on the setting file and the identification information of said recording medium, the second message being a decrypted electronic signature produced from the setting file and the identification information of said recording medium.

6. The information processing apparatus as claimed in claim 3, wherein the authentication check on said computer software program to be read is performed using identification information of said information processing apparatus and an electronic signature produced from the computer software program to be read.

7. The information processing apparatus as claimed in claim 6, wherein the authentication check on said setting file is performed based on a comparison between a first message and a second message, the first message being based on the computer software program to be read and the identification information of said information processing apparatus, the second message being a decrypted electronic signature produced from the computer software program to be read and the identification information of said information processing apparatus.

8. The information processing apparatus as claimed in claim 3, wherein functions of the computer software program started in accordance with a result of the authentication check on the computer software program to be read are notified to an operator as available functions.

9. The information processing apparatus as claimed in claim 1, wherein said detector includes a slot into which the recording medium is insertable, and further comprises a status monitoring section that monitors a plug and play of said recording medium with respect to said slot.

10. The information processing apparatus as claimed in claim 1, wherein said computer software program starting means reads a file used for the authentication check from said recording medium set in the accessible state by said recording-medium starting means so as to perform the authentication check by using said file.

11. An information processing apparatus comprising:
   detection means for detecting a recording medium being positioned to be set in an accessible state;
   recording-medium starting means for activating the recording medium detected by said detection means to activate the accessible state; and
   computer software program starting means for performing an authentication check on said recording medium activated by the recording-medium starting means, reading a computer software program from said recording medium only when a result of the authentication check is normal, and starting an execution of said computer software program.

12. The information processing apparatus as claimed in claim 11, wherein said computer software program starting means performs the authentication check on both a setting file recorded on said recording medium and on the computer software program to be read.

13. The information processing apparatus as claimed in claim 12, wherein the authentication check on said setting file is performed using an electronic signature produced from a setting file and identification information of said recording medium.

14. The information processing apparatus as claimed in claim 13, wherein the authentication check on said setting file is performed based on a comparison between a first message and a second message, the first message being based on the setting file and the identification information of said recording medium, the second message being a decrypted electronic signature produced from the setting file and the identification information of said recording medium.

15. The information processing apparatus as claimed in claim 14, wherein the authentication check on said computer software program to be read is performed using identification information of said information processing apparatus and an electronic signature produced from the computer software program to be read.

16. The information processing apparatus as claimed in claim 15, wherein the authentication check on said setting file is performed based on a comparison between a first message and a second message, the first message being based on the computer software program to be read and the identification information of said information processing apparatus, the second message being a decrypted electronic signature produced from the computer software program to be read and the identification information of said information processing apparatus.

17. The information processing apparatus as claimed in claim 12, wherein functions of the computer software program started in accordance with a result of the authentication check on the computer software program to be read are notified to an operator as available functions.

18. The information processing apparatus as claimed in claim 11, wherein said detection means includes a slot into which the recording medium is insertable, and further comprises status monitoring means for monitoring a plug and play of said recording medium with respect to said slot.

19. An image forming apparatus comprising:
   a detector that detects a recording medium to be positioned to be set in an accessible state;
   a recording-medium starting section that activates the recording medium detected by said detector to activate the accessible state; and
   a computer software program starting section that performs an authentication check on said recording medium activated by the recording-medium starting section, reads a computer software program relating to an image formation operation from said recording medium only when a result of the authentication check is normal, and starts an execution of said computer software program.

20. The image forming apparatus as claimed in claim 19, wherein said computer software program starting section reads a file used for the authentication check from said recording medium set in the accessible state by said recording-medium starting section so as to perform the authentication check by using said file.

21. The image forming apparatus as claimed in claim 19, wherein said computer software program starting section performs the authentication check on both a setting file recorded on said recording medium and on the computer software program to be read.

22. The image forming apparatus as claimed in claim 21, wherein the authentication check on said setting file is performed using an electronic signature produced from the setting file and identification information of said recording medium.

23. The image forming apparatus as claimed in claim 22, wherein the authentication check on said setting file is performed based on a comparison between a first message and a second message, the first message being based on the setting file and the identification information of said recording medium, the second message being a decrypted electronic signature produced from the setting file and the identification information of said recording medium.

24. The information processing apparatus as claimed in claim 21, wherein the authentication check on said computer software program to be read is performed using identification information of said image forming apparatus and an electronic signature produced from the computer software program to be read.

25. The information processing apparatus as claimed in claim 24, wherein the authentication check on said setting file is performed based on a comparison between a first message and a second message, the first message being based on the computer software program to be read and the identification information of said image forming apparatus, the second message being a decrypted electronic signature produced from the computer software program to be read and the identification information of said image forming apparatus.

26. The image forming apparatus as claimed in claim 21, wherein functions of the computer software program started in accordance with a result of the authentication check on the computer software program to be read are notified to an operator as available functions.

27. The information processing apparatus as claimed in claim 19, wherein said detector includes a slot into which the recording medium is insertable, and further comprises a status monitoring section that monitors a plug and play of said recording medium with respect to said slot.

28. The image forming apparatus as claimed in claim 19, further comprising:
   hardware resources used in an image forming process;
   computer software application programs configured to each perform a different process relating to the image formation operation; and
   a platform provided between said hardware resources and said computer software application programs so as to manage the hardware resources that are commonly used by at least two of said computer software application programs.

29. An image forming apparatus comprising:
detection means for detecting a recording medium being positioned to be set in an accessible state;
recording-medium starting means for activating the recording medium detected by said detection means to activate the accessible state; and
computer software program starting means for performing an authentication check on said recording medium activated by the recording-medium starting means, reading a computer software program relating to an image formation operation from said recording medium only when a result of the authentication check is normal, and starting an execution of said computer software program.

30. The image forming apparatus as claimed in claim 29, wherein said computer software program starting means reads a file used for the authentication check from said recording medium set in the accessible state by said recording-medium starting means so as to perform the authentication check by using said file.

31. The image forming apparatus as claimed in claim 30, wherein said computer software program starting means performs the authentication check on both a setting file recorded on said recording medium and on the computer software program to be read.

32. The image forming apparatus as claimed in claim 31, wherein the authentication check on said setting file is performed using an electronic signature produced from a setting file and identification information of said recording medium.

33. The image forming apparatus as claimed in claim 32, wherein the authentication check on said setting file is performed based on a comparison between a first message and a second message, the first message being based on the setting file and the identification information of said recording medium, the second message being a decrypted electronic signature produced from the setting file and the identification information of said recording medium.

34. The image forming apparatus as claimed in claim 33, wherein the authentication check on said computer software program to be read is performed using identification information of said information processing apparatus and an electronic signature produced from the computer software program to be read.

35. The image forming apparatus as claimed in claim 34, wherein the authentication check on said setting file is performed based on a comparison between a first message and a second message, the first message being based on the computer software program to be read and the identification information of said image forming apparatus, the second message being a decrypted electronic signature produced from the computer software program to be read and the identification information of said image forming apparatus.

36. The image forming apparatus as claimed in claim 31, wherein functions of the computer software program started in accordance with a result of the authentication check on the computer software program to be read are notified to an operator as available functions.

37. The image forming apparatus as claimed in claim 29, wherein said detection means includes a slot into which the recording medium is insertable, and further comprises status monitoring means for monitoring a plug and play of said recording medium with respect to said slot.

38. The image forming apparatus as claimed in claim 29, further comprising:
hardware resources used in an image forming process;
computer software application programs configured to each perform a process relating to the image formation operation; and
a platform provided between said hardware resources and said computer software application programs so as to manage the hardware resources that are commonly used by at least two of said computer software application programs.

39. A computer software program starting method comprising:
detecting a recording medium being positioned to be set in an accessible state;
activating the detected recording medium to activate the accessible state;
performing an authentication check on said activated recording medium;
reading a computer software program from said recording medium only when a result of the authentication check is normal; and
starting an execution of said computer software program.

40. A recording medium used with an information processing apparatus configured to detect the recording medium when correctly loaded thereto, the recording medium storing at least one computer software program that is to be read by said information processing apparatus and starting the computer software program that is to be read only when a result of an authentication check on the computer software program that is to be read is normal after said recording medium is detected and activated to be in an accessible state and the authentication check is performed successfully.

41. The recording medium as claimed in claim 40, wherein said information processing apparatus has a slot into which the recording medium is insertable, and the recording medium is arranged to be loaded to said information processing apparatus in a plug and play manner.

42. A recording-medium producing method of producing a recording medium that stores a computer software starting program which causes an information processing apparatus to start, the recording-medium producing method comprising:
producing license information using at least identification information of said recording medium; and
recording the license information produced by the producing step and the computer software starting program on said recording medium.

43. The recording-medium producing method as claimed in claim 42, wherein said step of producing also produces the computer software starting program using the identification information of said information processing apparatus.

44. The recording-medium producing method as claimed in claim 43, wherein said step of producing that also produces the computer software starting program using the identification information of said information processing apparatus includes identification information of the computer software starting program which said information processing apparatus is caused to start.

45. The recording-medium producing method as claimed in claim 44, wherein said step of producing also produces a second electronic signature from the identification information of said information processing apparatus and the computer software program, and, then, produces the computer software starting program based on the identification information of said information processing apparatus, the computer software program and the second electronic signature.

46. The recording-medium producing method as claimed in claim 45, wherein the second electronic signature is used for an authentication check on the computer software program.

47. The recording-medium producing method as claimed in claim 42, wherein said step of producing produces the license information further using identification information of said recording medium and effective computer software program information as to computer software programs usable by said information processing apparatus.

48. The recording-medium producing method as claimed in claim 47, wherein said step of producing also produces a first electronic signature from the identification information of said recording medium and the effective computer software program information, and, then, produces the license information based on the effective computer software program information and the first electronic signature.

49. The recording-medium producing method as claimed in claim 48, wherein the first electronic signature is used for an authentication check on the effective computer software program information.

50. The recording-medium producing method as claimed in claim 42, wherein said step of recording records on the recording medium at least one computer software starting program and at least one piece of license information corresponding to the computer software starting program on a one-to-one basis.

51. The recording-medium producing method as claimed in claim 42, wherein said step of recording records on the recording medium a plurality of computer software starting programs and one piece of license information corresponding to each of the computer software starting programs on a one-to-one basis.

52. The recording-medium producing method as claimed in claim 42, wherein said recording medium conforms to a plug and play standard.

53. The recording-medium producing method as claimed in claim 42, wherein said information processing apparatus is an image forming apparatus.

54. A recording-medium producing method of producing an updating recording medium for updating a starting recording medium that stores a computer software starting program to start an information processing apparatus, the recording-medium producing method comprising:

producing an updating computer software program for updating the computer software starting program which causes said information processing apparatus to start; and recording the updating computer software program produced by the producing step on said updating recording-medium.

55. The recording-medium producing method as claimed in claim 54, wherein the step of producing produces the updating computer software program using identification information of said information processing apparatus and a second computer software program which updates the computer software starting program which causes said information processing apparatus to start.

56. The recording-medium producing method as claimed in claim 55, wherein the step of producing also produces an electronic signature from the identification information of said information processing apparatus and said second computer software program, and, then, produces the updating computer software program based on the identification information of said information processing apparatus, the second computer software program and the electronic signature.

57. The recording-medium producing method as claimed in claim 56, wherein the electronic signature is used for an authentication check on the second computer software program.

58. The recording-medium producing method as claimed in claim 54, wherein the recording medium conforms to a plug and play standard.

59. The recording-medium producing method as claimed in claim 54, wherein said information processing apparatus is an image forming apparatus.

60. A recording-medium producing apparatus of producing a starting recording medium that stores a computer software program which causes an information processing apparatus to start, comprising:

a license information creation section that produces license information using at least identification information of said recording medium; and a recording section that records the license information produced by the producing step and the computer software program for starting the information apparatus on the starting recording medium.

61. A recording-medium producing apparatus for producing a starting recording medium that stores a computer software program which causes an information processing apparatus to start, comprising:

producing means for producing license information using at least identification information of said recording medium; and recording means for recording the license information produced by the producing means and the computer software program for starting the information processing apparatus on the starting recording medium.

62. A recording-medium producing apparatus of producing a starting recording medium that stores a computer software program which causes an information processing apparatus to start, comprising:

a license information creation section that produces license information using at least identification information of said recording medium; and a sending section that sends the license information produced by the license information creation section and the computer software program for starting the information processing apparatus to a recording section that records the license information produced by the license information creation section and the computer software program for starting the information processing apparatus on the starting recording medium.

63. A recording-medium producing apparatus for producing a starting recording medium that stores a computer software program which causes an information processing apparatus to start, comprising:

producing means for producing license information using at least identification information of said recording medium; and sending means for sending the license information and the computer software program for starting the information processing apparatus to recording means for recording the license information produced by the producing means and the computer software program for starting the information processing apparatus on the starting recording medium.

64. A recording-medium producing apparatus of producing an updating recording medium for updating a starting recording medium that stores a computer software program which causes an information processing apparatus to start, comprising:

an updating program creation section that produces an updating computer software program that updates the computer software program which causes said information processing apparatus to start using at least identification information of said information processing apparatus; and a recording section that records the updating computer software program produced by the updating computer software program creation section on the updating recording medium.

65. A recording-medium producing apparatus for producing an updating recording medium for updating a starting recording medium that stores a computer software program which causes an information processing apparatus to start, comprising:

producing means for producing an updating computer software program that updates the computer software program which causes said information processing apparatus to start using at least identification information of said information processing apparatus; and recording means for recording the updating computer software program produced by the producing means on the updating recording medium.

66. A recording-medium producing apparatus of producing an updating recording medium for updating a starting recording medium that stores a computer software program which causes an information processing apparatus to start, comprising:

an updating computer software program creation section that produces an updating computer software program that updates the computer software program which causes said information processing apparatus to start using at least identification information of said information processing apparatus; and a sending section that sends the updating computer software program to a recording section that records the updating computer software program produced by the updating computer software program creation section on the updating recording medium.

67. A recording-medium producing apparatus for producing an updating recording medium for updating a starting recording medium that stores a computer software program which causes an information processing apparatus to start, comprising:

the computer software program which causes said information processing apparatus to start using at least identification information of said information processing apparatus; and sending means for sending the updating computer software program to recording means for recording the updating computer software program produced by the producing means on the updating recording medium.

68. A recording-medium producing system of producing a starting recording medium that stores a computer software program which causes an information processing apparatus to start, comprising:

a license information creation section that produces license information of said starting recording medium using at least identification information of said starting recording medium; and a recording section that records the license information produced by the license information creation section and the computer software program for starting the information processing apparatus on said starting recording medium, wherein said license information creation section and said recording section are connected to each other via a predetermined network.

69. A recording-medium producing system for producing a starting recording medium that stores a computer software program which causes an information processing apparatus to start, comprising:

producing means for producing license information of said starting recording medium using at least identification information of said starting recording medium; and recording means for recording the license information produced by the producing means and the computer software program for starting the information processing apparatus on said starting recording medium, wherein said producing means and said recording means are connected to each other via a predetermined network.

70. A recording-medium producing system of producing an updating recording medium for updating a starting recording medium that stores a computer software program which causes an information processing apparatus to start, comprising:

an updating computer software program creation section that produces an updating computer software program which causes the information processing apparatus to start using at least identification information of said information processing apparatus; and a recording section that records the updating computer software program produced by the updating computer software program creation section on said updating recording medium, wherein said updating computer software program creation section and said recording section are connected to each other via a predetermined network.

71. A recording-medium producing system for producing an updating recording medium for updating a starting recording medium that stores a computer software program which causes an information processing apparatus to start, comprising:

producing means for producing an updating computer software program which causes the information processing apparatus to start using at least identification information of said information processing apparatus; and recording means for recording the updating computer software program produced by the producing means on said updating recording medium, wherein said producing means and said recording means are connected to each other via a predetermined network.

72. A recording medium for storing at least one computer software program which causes an information processing apparatus to start, wherein the recording medium stores license information produced using at least identification information of said recording medium and a starting computer software program produced based on the identification information of said information processing apparatus and the computer software program which causes said information processing apparatus to start.

73. The recording medium as claimed in claim 72, wherein the license information is produced based on a first electronic signature and effective computer software program list that indicates computer software programs usable by said information processing apparatus, the first signature being produced from the identification information of said recording medium and the effective computer software program list.

74. The recording medium as claimed in claim 72, wherein the starting computer software program is produced based on a second electronic signature, the identification information of said information processing apparatus and the computer software program which said information processing apparatus is to start, said second electronic signature being produced from the identification information of said information processing apparatus and the computer software program which causes said information processing apparatus to start.

75. The recording medium as claimed in claim 72, wherein said recording medium conforms to a plug and play standard.

76. An updating recording medium for updating a starting recording medium that stores a computer software program which causes an information processing apparatus to start, the updating recording medium storing identification information of said information processing apparatus and an updating computer software program that updates the computer software program which causes said information processing apparatus to start.

77. The recording medium as claimed in claim 76, wherein said updating computer software program is produced based on an electronic signature, the identification information of said information processing apparatus and a second computer software program, the electronic signature being produced from the identification information of said information processing apparatus and a second computer software program that updates the computer software program which causes said information processing apparatus to start.

78. The recording medium as claimed in claim 76, wherein said recording medium conforms to a plug and play standard.

* * * * *